(12) United States Patent
Mastrogiannis

(10) Patent No.: US 11,708,718 B2
(45) Date of Patent: *Jul. 25, 2023

(54) MULTIFUNCTIONAL WINDOW

(71) Applicant: Ray Dahdal, Philadelphia, PA (US)

(72) Inventor: Spyridon Mastrogiannis, Kamatero Attkis (GR)

(73) Assignee: Ray Dahdal, Philadelphia, PA (US)

( * ) Notice: Subject to any disclaimer, the term of this patent is extended or adjusted under 35 U.S.C. 154(b) by 265 days.

This patent is subject to a terminal disclaimer.

(21) Appl. No.: 17/082,142

(22) Filed: Oct. 28, 2020

(65) Prior Publication Data

US 2021/0079713 A1 Mar. 18, 2021

Related U.S. Application Data

(63) Continuation of application No. 16/632,675, filed as application No. PCT/GR2018/000034 on Jul. 3, 2018, now Pat. No. 10,851,580.

(30) Foreign Application Priority Data

Jul. 31, 2017 (GR) .............................. 20170100357

(51) Int. Cl.
*E06B 3/50* (2006.01)
*B29C 53/58* (2006.01)
(Continued)

(52) U.S. Cl.
CPC .......... *E06B 3/5063* (2013.01); *B29C 53/582* (2013.01); *B29C 53/68* (2013.01);
(Continued)

(58) Field of Classification Search
CPC .... E06B 3/5063; E06B 3/509; E05D 13/1207
See application file for complete search history.

(56) References Cited

U.S. PATENT DOCUMENTS 1,854,419 A * 4/1932 Neuhausen ............... E06B 3/50
49/129
1,941,369 A * 12/1933 Thomas ................ E06B 3/5063
49/129
(Continued)

FOREIGN PATENT DOCUMENTS

CA 2382933 A1 * 12/2002 ............. E05D 13/08
CN 2367743 3/2000
(Continued)

*Primary Examiner* — Marcus Menezes
(74) *Attorney, Agent, or Firm* — Volpe Koenig

(57) ABSTRACT

A sash (62) of a window opening up to 180° and capable of tilting is mounted onto a fixedly installed frame profile (63) and houses a pair of superimposing sashes that fit tightly therein when in closure position, i.e. an upper stationary sash (65) and a lower movable-divertible sash (64), each of the sashes (64,65) provided with laterally extending shafts (49) for connection with sash (62), roller wheels (50) provided onto the shafts (49) of sash (64) that roll within a predefined path created by insert guide profile members (19) and diverter guide members (66,68) to alternately bring sash (64) in a position of superimposing sash (65) and a position of alignment with the same. Lifting mechanisms (46) provided with a regulatory screw (84) for adjusting the pretension of a spring component thereof and thereby the force required by the user for moving the sash (64) are installed within the vertically extending sides of the sash (62).

9 Claims, 17 Drawing Sheets

(51) Int. Cl.
    *B29C 53/68*     (2006.01)
    *B29C 53/80*     (2006.01)
    *E05D 13/00*     (2006.01)
    *E05D 15/48*     (2006.01)
    *E05F 1/16*     (2006.01)
    *E06B 3/44*     (2006.01)
    *E06B 7/16*     (2006.01)
    *B29K 71/00*     (2006.01)
    *B29K 307/04*     (2006.01)
    *B29K 309/08*     (2006.01)
    *B29L 23/00*     (2006.01)

(52) U.S. Cl.
    CPC ...... *B29C 53/8041* (2013.01); *E05D 13/1207* (2013.01); *E05D 15/48* (2013.01); *E05F 1/16* (2013.01); *E06B 3/4407* (2013.01); *E06B 3/509* (2013.01); *E06B 7/16* (2013.01); *B29K 2071/00* (2013.01); *B29K 2307/04* (2013.01); *B29K 2309/08* (2013.01); *B29L 2023/22* (2013.01); *E05D 2015/485* (2013.01); *E05D 2015/487* (2013.01); *E05Y 2900/148* (2013.01)

(56) References Cited

U.S. PATENT DOCUMENTS

| | | | | |
|---|---|---|---|---|
| 2,182,008 A * | 12/1939 | Trombetta | ........... | E06B 3/50 49/455 |
| 2,201,105 A * | 5/1940 | Fabriani | ........... | E06B 3/5063 49/188 |
| 2,289,960 A * | 7/1942 | Leopol | ........... | E06B 3/44 49/129 |
| 2,317,312 A * | 4/1943 | Swanson | ........... | E06B 3/4627 49/214 |
| 2,584,684 A * | 2/1952 | Etling | ........... | E06B 3/5063 49/185 |
| 2,594,684 A | 2/1952 | Etling | | |
| 2,678,477 A * | 5/1954 | Russell | ........... | E06B 3/44 49/157 |
| 2,785,444 A * | 3/1957 | Bender | ........... | E06B 3/50 49/155 |
| 2,825,090 A * | 3/1958 | Fredc | ........... | E05D 13/1207 16/202 |
| 3,694,959 A * | 10/1972 | Gartner | ........... | E06B 3/44 49/128 |
| 3,959,926 A * | 6/1976 | Noecker | ........... | E06B 1/6069 49/504 |
| 3,981,101 A * | 9/1976 | Guzzi | ........... | E05D 13/1207 49/188 |
| 4,324,072 A * | 4/1982 | Sterner, Jr. | ........... | E05D 15/10 49/260 |
| RE31,721 E * | 11/1984 | Sterner, Jr. | ........... | E05D 15/0604 49/260 |
| 4,570,381 A * | 2/1986 | Sterner, Jr. | ........... | E05D 15/20 49/129 |
| 4,924,930 A * | 5/1990 | Drennan | ........... | E06B 3/44 160/90 |
| 5,042,199 A * | 8/1991 | Schneider | ........... | E06B 3/5063 49/446 |
| 5,189,837 A * | 3/1993 | Ienaga | ........... | E06B 3/4627 49/214 |
| 5,749,172 A * | 5/1998 | Isopahkala | ........... | E05D 15/58 49/127 |
| 6,082,432 A * | 7/2000 | Kissinger | ........... | E06B 9/54 160/28 |
| 6,336,246 B1 * | 1/2002 | Giovannetti | ........ | E05D 15/1005 49/128 |
| 6,421,960 B1 * | 7/2002 | Manzella | ........... | E05D 15/526 49/192 |
| 6,516,566 B2 * | 2/2003 | Finke | ........... | E05D 15/0652 49/130 |
| 6,896,026 B2 * | 5/2005 | Martin | ........... | E06B 9/52 52/656.1 |
| 8,113,607 B2 * | 2/2012 | Slager | ........... | E05B 65/0882 49/128 |
| 8,627,604 B2 * | 1/2014 | Seymour | ........... | E06B 3/922 49/141 |
| 9,470,028 B2 * | 10/2016 | Header | ........... | E05D 15/0652 |
| 1,228,036 A1 | 5/2017 | Luken | | |
| 11,286,709 B2 * | 3/2022 | Bernhagen | ........... | E05D 15/48 |
| 2003/0150165 A1 * | 8/2003 | Ronay | ........... | E06B 3/44 49/128 |
| 2005/0283944 A1 * | 12/2005 | Wu | ........... | E05D 13/1207 16/194 |
| 2006/0207185 A1 * | 9/2006 | Shuler | ........... | E05D 15/22 49/445 |
| 2006/0254143 A1 * | 11/2006 | Pettit | ........... | E05B 63/128 49/185 |
| 2007/0157520 A1 * | 7/2007 | Daniels | ........... | E06B 3/44 49/185 |
| 2008/0163549 A1 * | 7/2008 | Kim | ........... | E06B 9/02 49/129 |
| 2010/0011669 A1 * | 1/2010 | Liang | ........... | E05D 13/1207 49/506 |
| 2010/0115845 A1 * | 5/2010 | Lago Palacios | .... | E05D 13/1253 49/128 |
| 2010/0269292 A1 * | 10/2010 | Liang | ........... | E05D 13/1207 16/199 |
| 2015/0004074 A1 | 1/2015 | Lesniak et al. | | |
| 2016/0040474 A1 * | 2/2016 | Geng | ........... | E06B 3/509 49/177 |
| 2017/0152688 A1 * | 6/2017 | Liang | ........... | E05C 1/06 |
| 2018/0202198 A1 * | 7/2018 | Hollermann | ........... | E05C 1/12 |
| 2019/0178008 A1 * | 6/2019 | DeBoer | ........... | E05B 65/0852 |

FOREIGN PATENT DOCUMENTS

| | | | | |
|---|---|---|---|---|
| CN | 2718189 | | 8/2005 | |
| CN | 202926111 | | 5/2013 | |
| CN | 205259835 | | 5/2016 | |
| GB | 2109043 | A * | 5/1983 | ............ E06B 3/44 |
| GB | 2150187 | A * | 6/1985 | ............ E06B 3/44 |
| NL | 6515526 | | 5/1967 | |
| WO | 200181696 | | 11/2001 | |
| WO | 2013180441 | | 12/2013 | |
| WO | 2014027770 | | 2/2014 | |
| WO | WO-2019025823 | A1 * | 2/2019 | ............ B29C 53/582 |

* cited by examiner

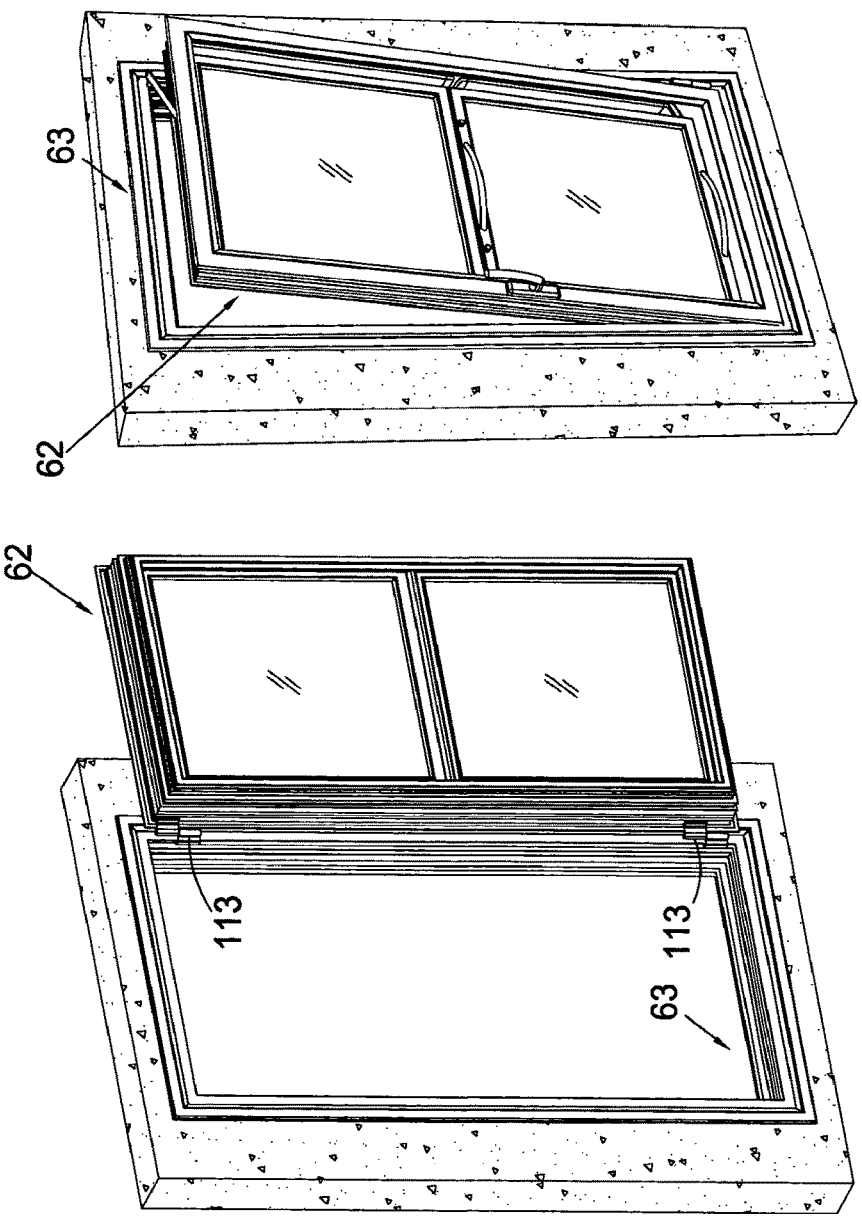
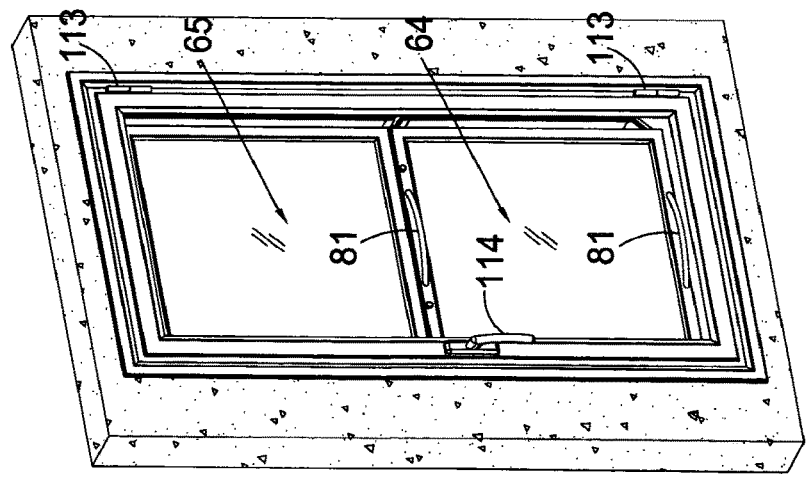
FIG. 21c
FIG. 21b
FIG. 21a

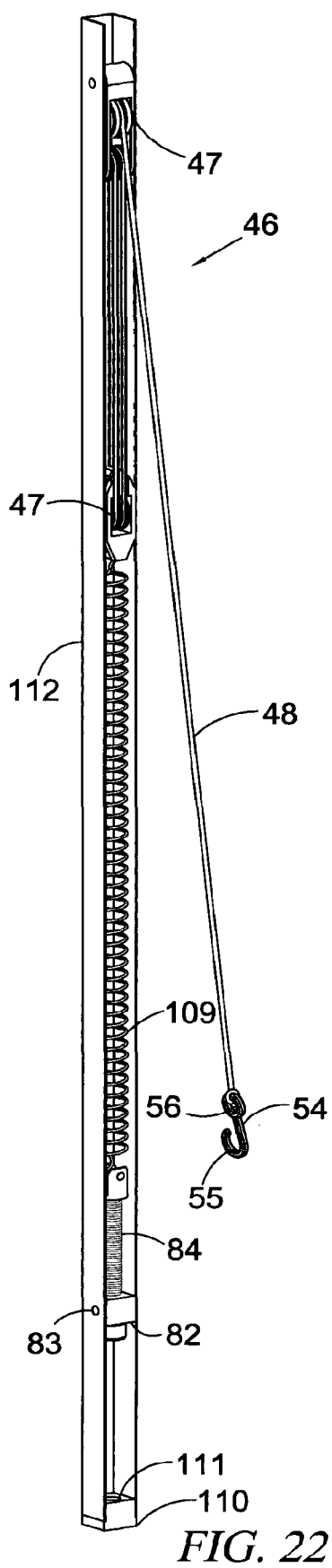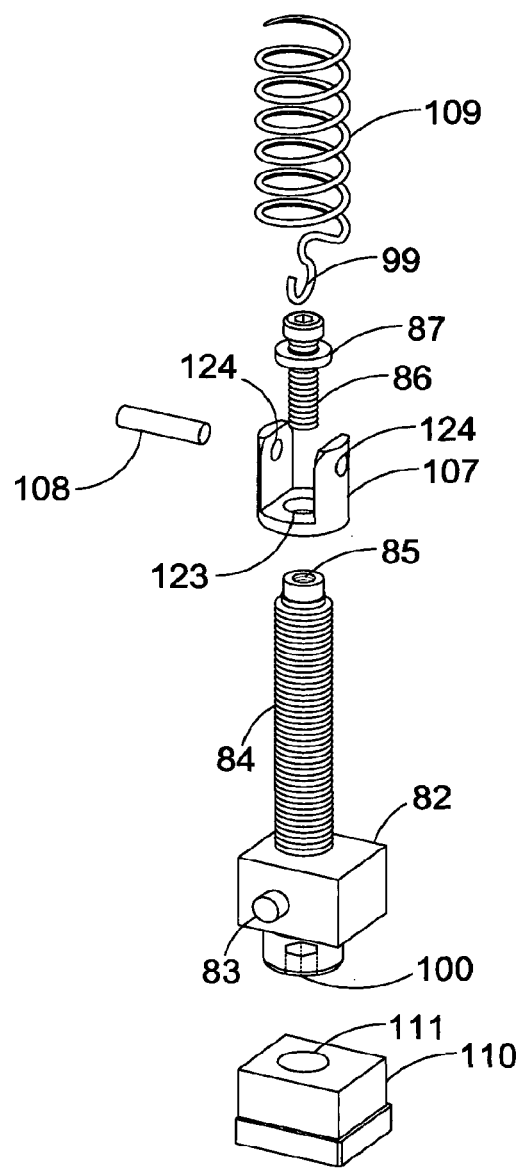
FIG. 22
FIG. 23

MULTIFUNCTIONAL WINDOW

INCORPORATION BY REFERENCE

The following documents are incorporated herein by reference as if fully set forth: U.S. patent application Ser. No. 16/632,675, filed Jan. 21, 2020; International Application No. PCT/GR2018/000034, filed Jul. 3, 2018; and Greece Patent Application No. 20170100357, filed Jul. 31, 2017.

TECHNICAL FIELD

The invention relates to a multifunctional window and system of construction thereof.

BACKGROUND

There can be found no similar structure of window systems in the manufacturing technology of the prior art. Currently commercially available windows provide merely a part of the functions provided by the window of the invention. These windows of the prior art are either opening/tilting or comprising two superimposing sashes that move in parallel directions, either horizontally or vertically. These windows do not cover the objectives and requirements that led to the study and design of the window of the present invention. In the market of superimposed windows, a pair of window sashes is adapted to move either in the left to right or in the top to bottom, horizontal or vertical direction respectively, one sash next to the other, thereby exploiting only 50% of the total surface area of the opening, when the window is set in the open position. In addition, these windows suffer from inferior water and air tightness, since the surrounding frame profile member thereof is not provided with a rubber sealant member that would impede movement of the window sashes, but with ordinary brushes that exhibit minimal friction, but do not provide an adequate water and air tightness and are subject to rapid wear. In order to enable the user to handily lift the movable sash, these windows are provided with a lifting mechanism that is nested within a H-shaped base, this base being mounted either within a vertically extending side of the frame profile member or within a vertically extending side of the movable sash. By way of example, a lifting mechanism comprises a hoist, end rollers with a cord wound around the end rollers, said cord exerting, when pulled by the user, a pulling force onto a spring member of the lifting mechanism that facilitates lifting of the movable sash. However, when the weight of the moving sash is not coincident with the pulling force of the hoisting mechanism, it is difficult for the user to appropriately regulate the tension of the spring of the lifting mechanism and it becomes impossible to effect such regulatory action on the window after installation thereof.

Cleaning of both sides of the glazing of the pair of window sashes is a difficult task for the user because the two sashes of the window must be tilted inwardly in order to effectively clean them on both sides. Furthermore, windows of this type can only apply an anti-insect sheet at 50% of the overall window surface area because of the limited opening thereof, thereby making it impossible to exploit the entire opening and cover such entire opening with an anti-insect protective sheet.

SUMMARY

It is the object of the invention as described hereinafter to provide solution to these main disadvantages of the prior art by establishing a new technical rule in the technology of window construction.

It is one object of the invention to provide a smaller window comprising a pair of superimposing window sashes mounted within an interior side of a frame profile member of a larger opening window sash, said pair of superimposing window sashes comprising a stationary sash mounted within said frame profile member of a larger opening sash and a movable sash that is adapted to be tilted, raised and be superimposed onto the fixedly mounted sash when the window is brought at an open position, whilst being adapted to be brought at the plane of the stationary sash when the window is brought to closure, thereby allowing the smaller window to provide an enhanced water/air tightness by being fitted with a circumferential rubber sealant provided within the interior side of the frame profile member of the large opening window sash.

It is another object of the invention to provide the smaller window with an upper sash fixedly mounted or being provided with a tilting capacity and a lower sash that is provided with a tilting capacity and can divert and move from a window closure position wherein it is brought in alignment with the upper sash to a window partially or fully open position wherein it is diverted outwardly and is partially or fully superimposed onto the upper sash.

In order to clean the glazing of the smaller window sashes, the larger window sash is opened, so that the exterior glazing is being brought at the interior and it may therein be handily cleaned by the user. Opening of the larger window sash allows exploitation of the entire area of the opening and therefore provides enhanced ventilation. Opening of the larger window sash to 180° is important because it substantially improves the exit of people in case of an emergency (e.g. fire). The larger window sash may also be provided with a tilting capacity thereby allowing an overall perimetrical ventilation when brought at an inclined position without the air brought from the outside causing any discomfort.

The basic concept in the construction of the multifunctional window is that the smaller window comprising a pair of alternately superimposed and aligned sashes with glazing is fitted within a larger opening-tilting window sash, wherein one of the sashes of the smaller window moves upwardly and downwardly based onto a plurality of roller wheels that roll within a predetermined path being defined by diverting guide members and insert guide members that define movement of the movable sash regardless of the size of the window. When the window is fully opened, it is easy for the user to downwardly roll the anti-insect sheet that is provided wound around a roll located on top of the window frame.

The main advantages provided by this invention are:
1) Absolute water and air tightness.
2) Exploitation of 100% of the available opening by the opening window sash.
3) Easy exit of people in case of emergency.
4) Easy entry and exit of objects.
5) Easy process of bilateral cleaning of the glazing of the sashes of the smaller window by the user.
6) Easy deployment of an anti-insect protective sheet at the entire (100%) surface area of the opening, offering enhanced ventilation and protection from insects.
7) Easily functioning of the movable sash without high friction thanks to the provision of four wheels at the four edges of the movable sash.
8) Noiseless operation of the window.
9) Many options for adjusting ventilation provided in the proposed window structure.
10) Capacity of regulation of the pulling force of the lifting mechanism of the movable sash, so as to provide the best possible balancing of the weight of the movable sash with the pulling force of the lifting mechanism even after installation thereof.

11) Handy removal and replacement of the lifting mechanism of the movable sash after installation thereof.

12) Excellent aesthetic result.

BRIEF DESCRIPTION OF THE DRAWINGS

Embodiments of the invention are described by references to the drawings, which provide illustrative explanation in a technologically clear manner of the functioning of the multifunctional window, wherein:

FIG. 17 also shows the position of the lifting mechanism of the lower small window sash.

FIG. 21A is a perspective view of the multifunctional window with the large opening-tilting sash in a closed position.

FIG. 21B is a perspective view of the multifunctional window with the large opening-tilting sash having being brought at an open position through rotation at an angle of 180°.

FIG. 21C is a perspective view of the multifunctional window with the large opening-tilting sash in a tilted position.

FIG. 22 shows a perspective view of the lifting mechanism of the movable-divertible small window sash with the regulatory screw used for varying the pulling force of the mechanism.

FIG. 23 shows in perspective the regulatory screw and other accessories being used in the regulation of the pulling force of the lifting mechanism by means of varying the elongation of the spring thereof.

DETAILED DESCRIPTION

Figure 1A:
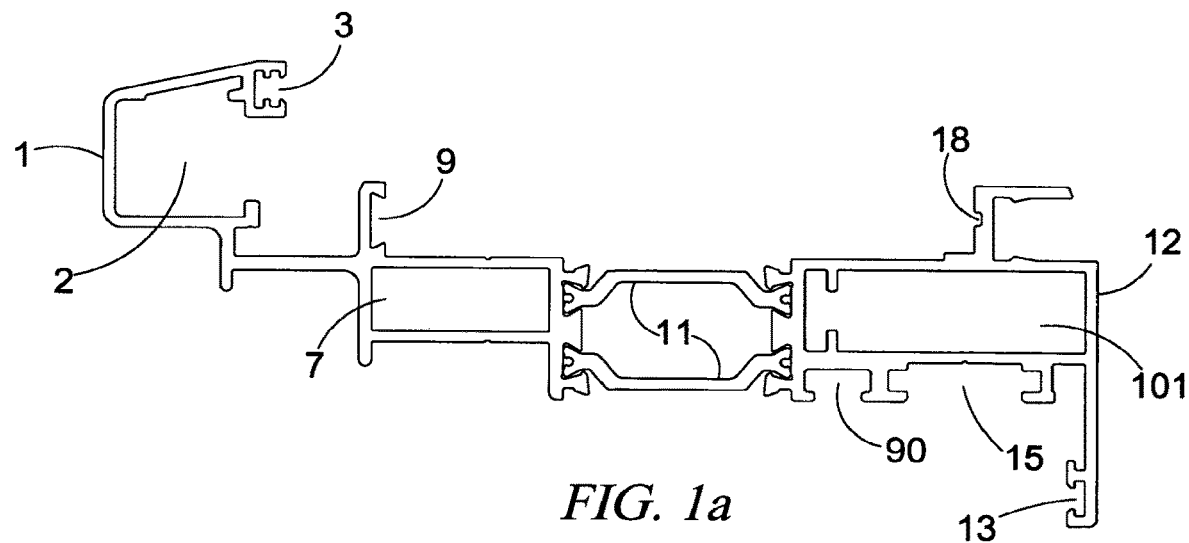
FIG. 1A shows a sectional view of a sash profile member with thermal break that is employed in the construction of the large opening-tilting sash of the invention.

The multifunctional window depicted in the drawings is mounted within a thermally broken frame profile member 63 that is fixedly mounted around the window opening, and comprises a large sash constructed from a profile member with a thermal break 62, wherein a pair of superimposing small window sashes of a stationary small sash 65 and a movable-divertible small sash 64 are mounted within the abovementioned large sash.

Figure 2A:
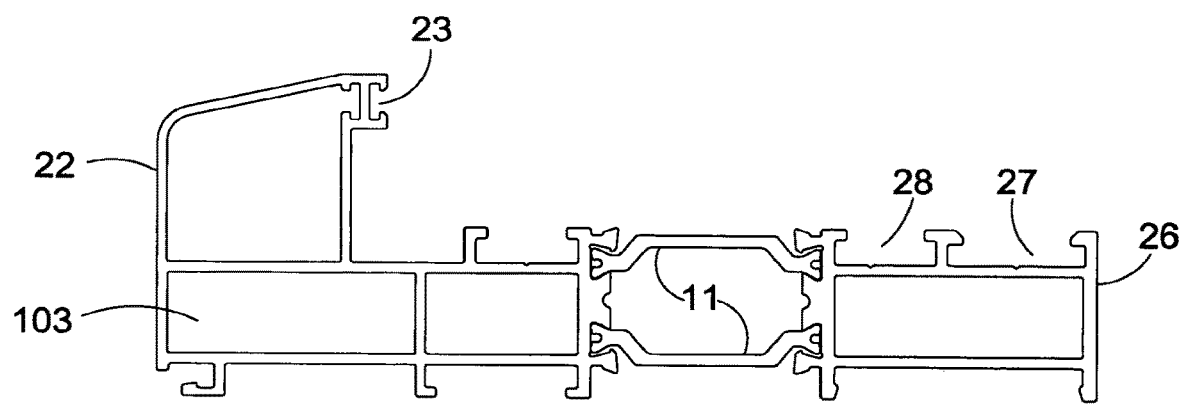
FIG. 2A shows a sectional view of the frame profile member with thermal break that is adapted to receive the large opening-tilting sash of the invention.
Figure 2B:
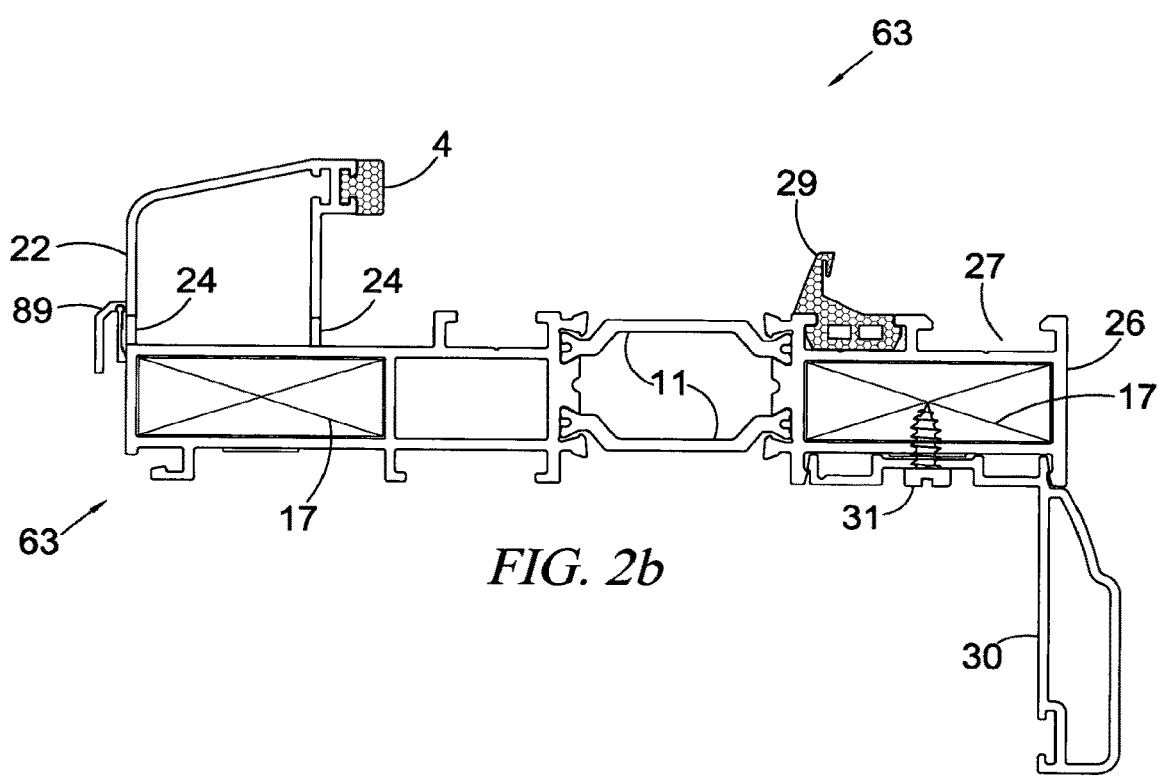
FIG. 2B shows a sectional view of the frame profile member of FIG. 2A with all the constituent accessories assembled therein.

As shown in FIGS. 2A and 2B, the abovementioned thermally broken frame profile member 63 comprises a first profile member 22 and a second profile member 26, the two profile members 22, 26 being connected to each other by means of plastic polyamides 11, thereby creating the thermally broken frame profile member 63. The first profile member 22 is provided with a groove 23 adapted to receive through snap-fitting or sliding-fitting a rubber sealant 4 and with apertures 24 for the drainage of water. Commercially available caps 89 are provided at the exterior of profile member 22 onto these external drainage apertures 24 of profile 22, such caps 89 being provided with a valve allowing water drainage, whilst averting air passage through the apertures 24. The profile member 26 is provided with a groove 27 adapted to receive commercial accessories, such as hinges, tilting mechanisms, etc. and with an adjacently located groove 28 adapted to receive a central rubber sealing gasket 29. The profile member 26 is also provided with a snapping or screwable wall cover profile member 30 being screwed with screws 31, as shown in FIG. 2*b*. The ends of appropriately dimensioned lengths of the frame profile member 63 are being cut at an angle of 45 degrees and are subsequently subjected to a punching perforation press mechanism to provide appropriately spaced holes for being joined by means of commercial mechanical corner joints 17, thereby creating the frame of the large window sash with the desired dimensions. Hinges 113 and tilting mechanism accessories are used for opening and tilting the large window sash 62 onto the frame member 63, wherein these hinges 113 and tilting mechanism accessories are mounted within grooves 27 and 15 of the frame profile member 63 and of the large sash 62 respectively, as shown in FIGS. 21A, 21B, 21C.

Figure 3A:
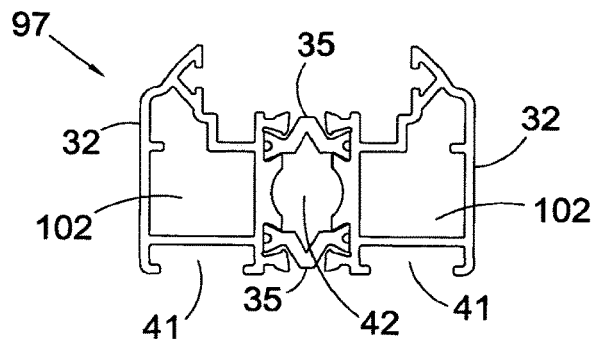
FIG. 3A shows a sectional view of the profile member with a thermal break that is used in the construction of the stationary and of the movable-deflectable sash of the small window without a metallic strip used for mounting the glazing.
Figure 3B:
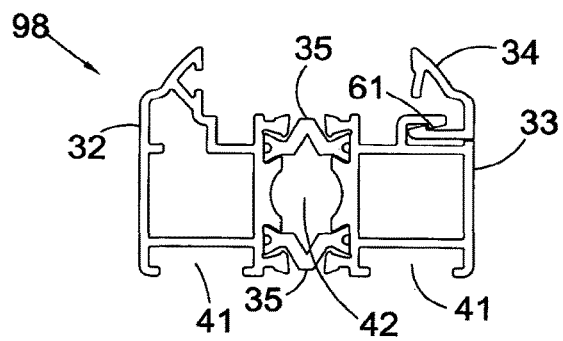
FIG. 3B shows a sectional view of the profile member with a thermal break that is used in the construction of the stationary and of the movable-deflectable sash of the small window with a metallic strip used for mounting the glazing.
Figure 3C:
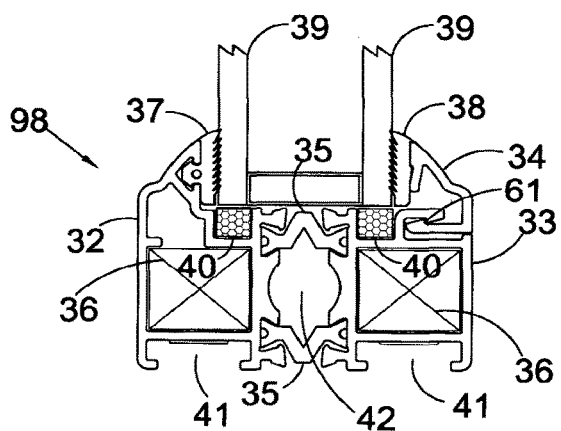
FIGS. 3C and 3D show sectional views of the profile members of the stationary and of the movable-deflectable sash of the small window without and with a metallic strip used for mounting the glazing, as shown in FIGS. 3A and 3B, respectively, with constituent accessories thereof assembled therein.
Figure 3D:
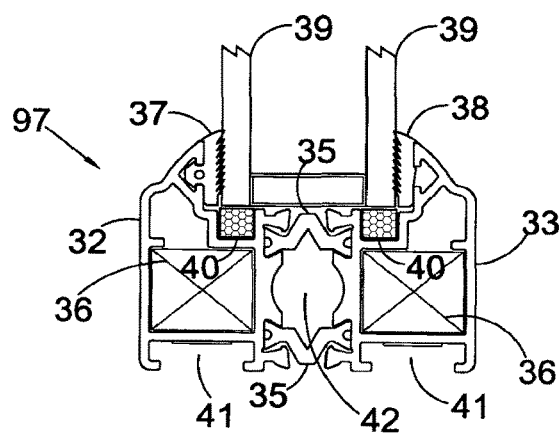

The stationary small sash 65, as well as the movable-divertible small sash 64 of the window as shown in FIGS. 3A, 3B, 3C, 3D and 16 are manufactured either from a pair of identical profile members 32 connected by means of plastic thermal break polyamides 35 thereby providing the small window sash profile with thermal break 97 without a metallic strip 34 being fitted circumferentially around the sash to hold in place the glazing 39 facing the building's interior. Alternatively the small stationary and movable-divertible sashes are being manufactured, with the abovementioned glazing supporting metallic strip 34, from a profile member 32 connected by means of plastic thermal break polyamides 35 with a profile member 33 that is adapted to host the glazing supporting metallic strip 34, thereby providing the small window sash profile with thermal break 98 that incorporates the detachably connectable metallic strip 34 that holds in place the glass pane 39. The profile members 32 and 33 are provided with grooves 41 at the bottom thereof. The profile member 33 is provided with an extending arm having an interior tooth 61 that provides a clipping engagement of the abovementioned glazing supporting metallic strip member 34 of the glass pane 39. The double glass pane 39 as shown in FIGS. 3C and 3D is mounted within profile members 32 and 33 with intermediate rubber sealing members 37 and 38, the latter also supporting the metallic strip member 34 at a position of engagement. In order to change the glass pane 39, one has to remove rubber sealants 38 thereby allowing the metallic strip member 34 to tilt towards the glazing and disengage from the interior tooth 61 of the profile member 33. At the bottom, the glass panes are sealed with perimetrically mounted sealing rubbers 40. It is important to note that the thermally broken small window sash profiles with thermal break 98 and 97 that respectively incorporate or do not incorporate the detachably connectable metallic strip 34, are provided with an opening 42 located at the center thereof, this opening being adapted to appropriately house shafts 49 which may move and immobilized at a desired position on either side, at the top and at the bottom, of the small window sashes 64 and 65, as shown in FIGS. 3C, 3D, 14, 15 and 16. In this way it is easy to install and remove the small window sashes 64 and 65 from the large sash 62. The small window sashes 64 and 65 are formed by cutting appropriate lengths of the thermally insulated small window sash profiles 97 and 98, with their edges cut at a 45-degree angle for being joined by means of commercial mechanical corner joints 36, thereby creating the frames of the small window sashes 64 and 65 with the desired dimensions.

Figure 1B:
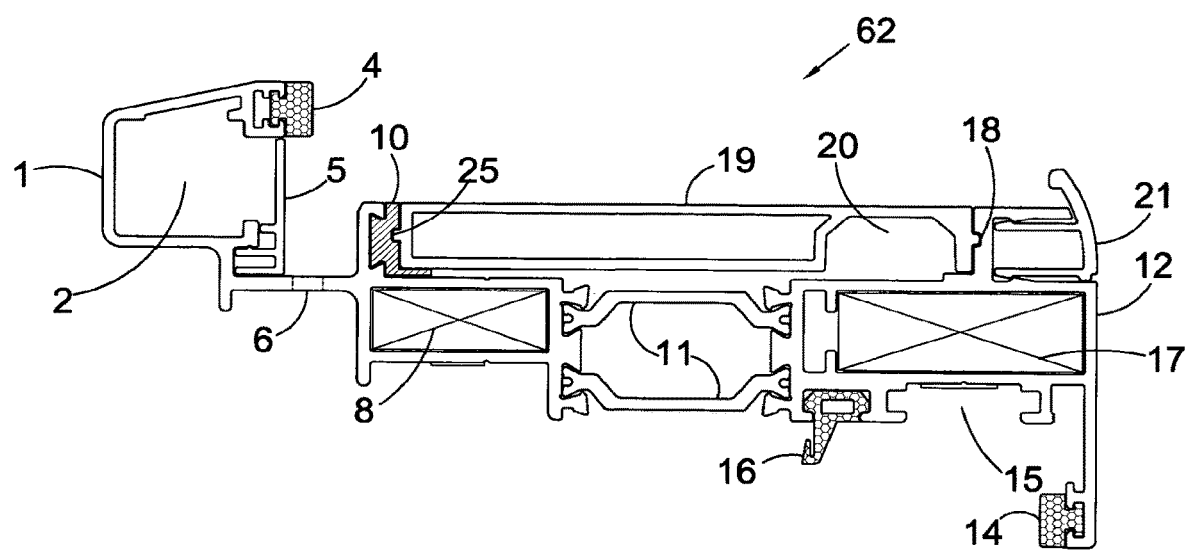
FIG. 1B shows a sectional view of the sash profile member of FIG. 1A fitted with all the accessories that constitute the large opening-tilting sash of the invention.
Figure 4:
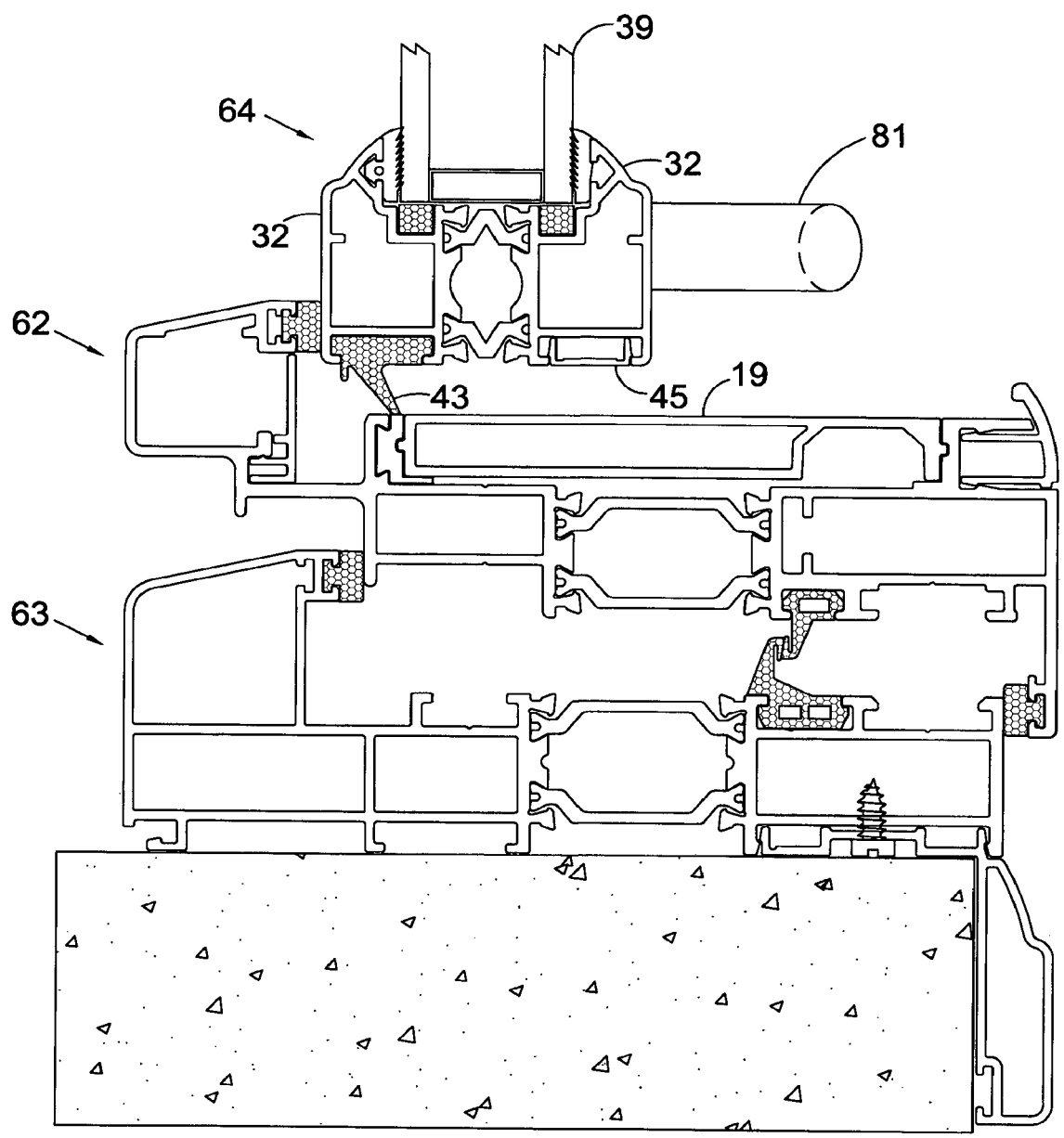
FIG. 4 shows a sectional view of the bottom of the overall window structure.
Figure 5:
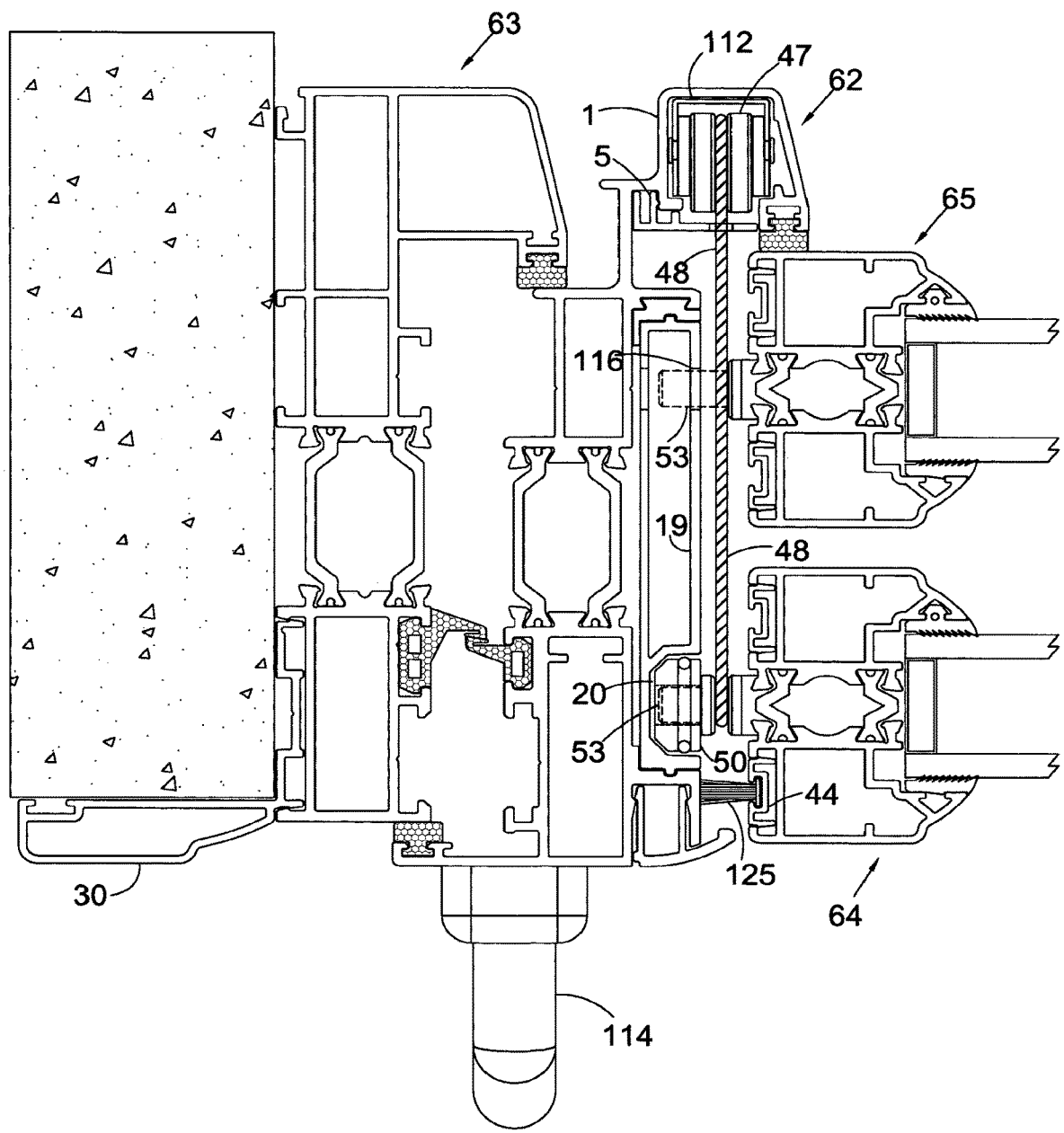
FIG. 5 shows a sectional view of the arrangement of the profiles and constituent parts of one side of the window when the movable sash of the small window is in opened position.
Figure 6:
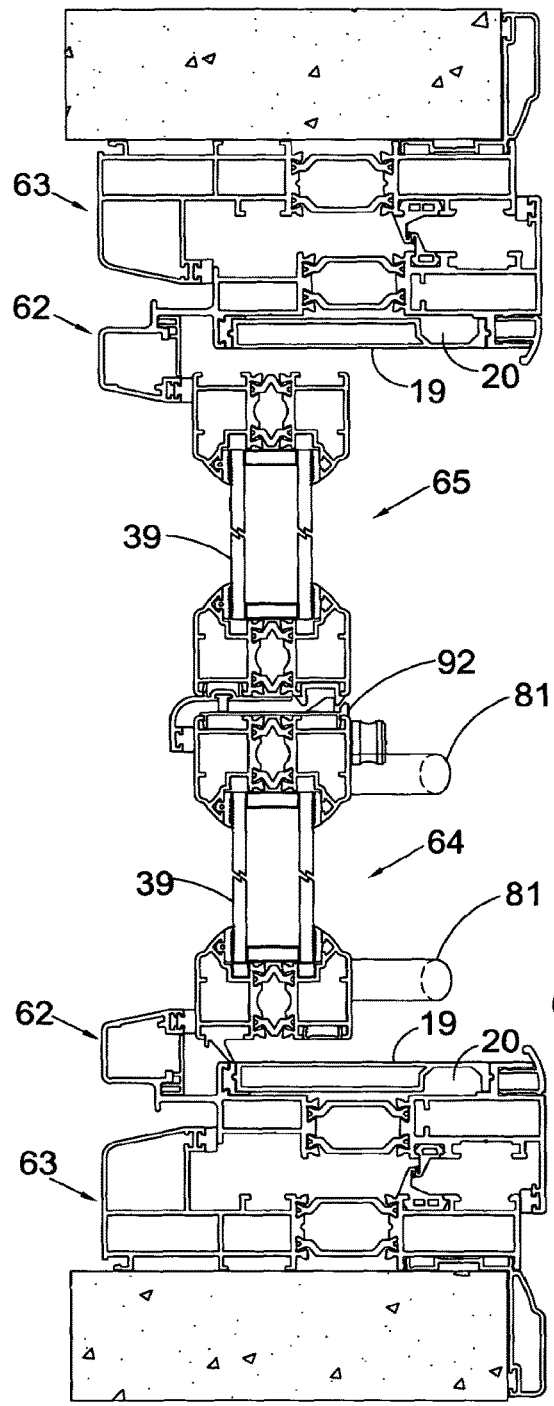
FIG. 6 shows a vertical sectional view of the entire window with the movable sash of the small window in a closed and locked position.
Figure 7:
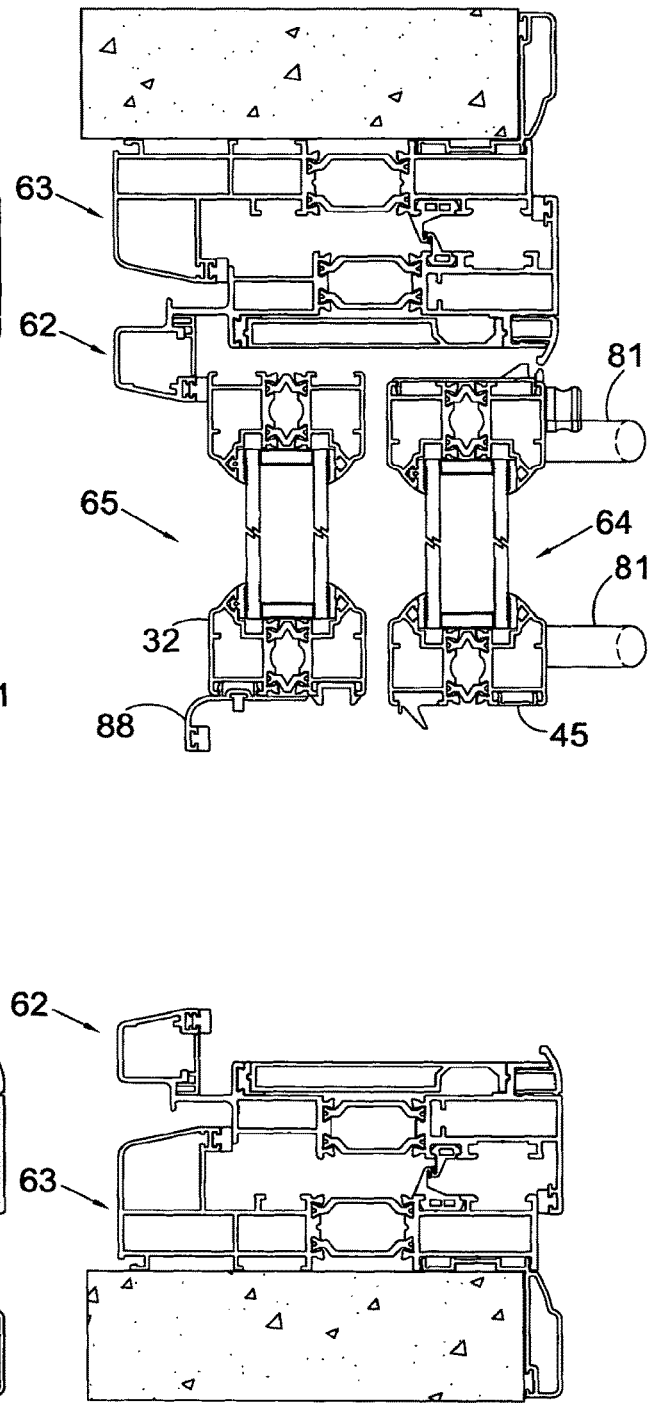
FIG. 7 shows a vertical sectional view of the entire window with the movable sash of the small window fully raised to an open position.
Figure 8:
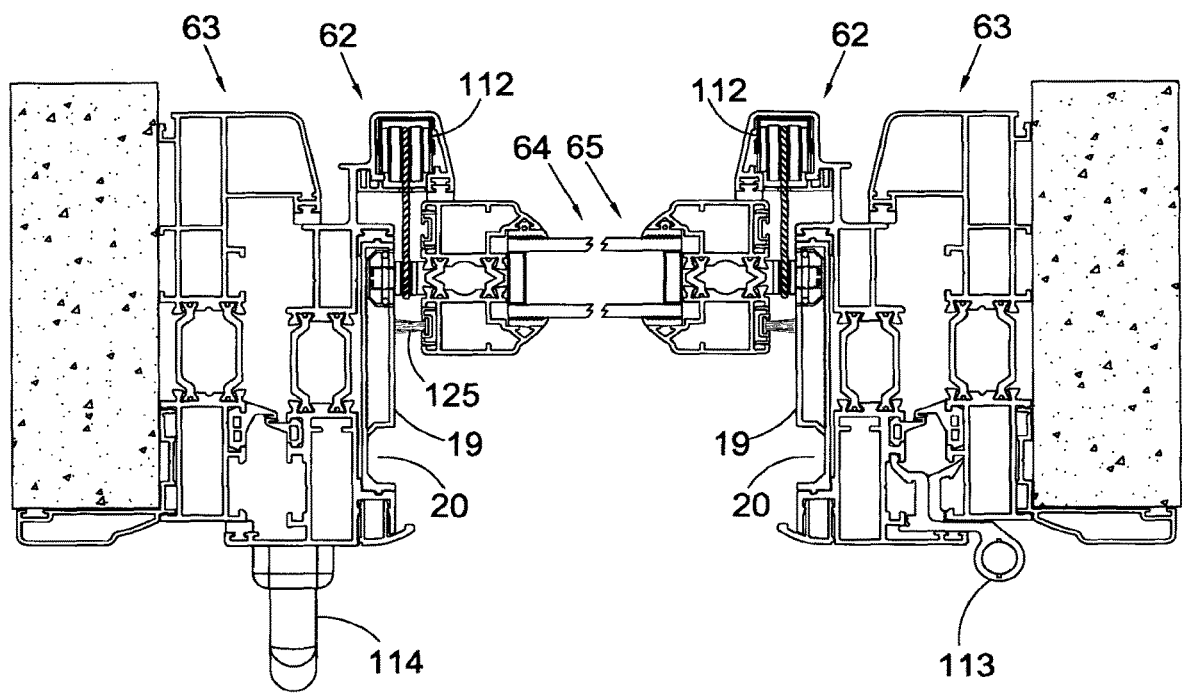
FIG. 8 shows a horizontal sectional view of the entire window with the movable sash of the small window in a closed position.
Figure 9:
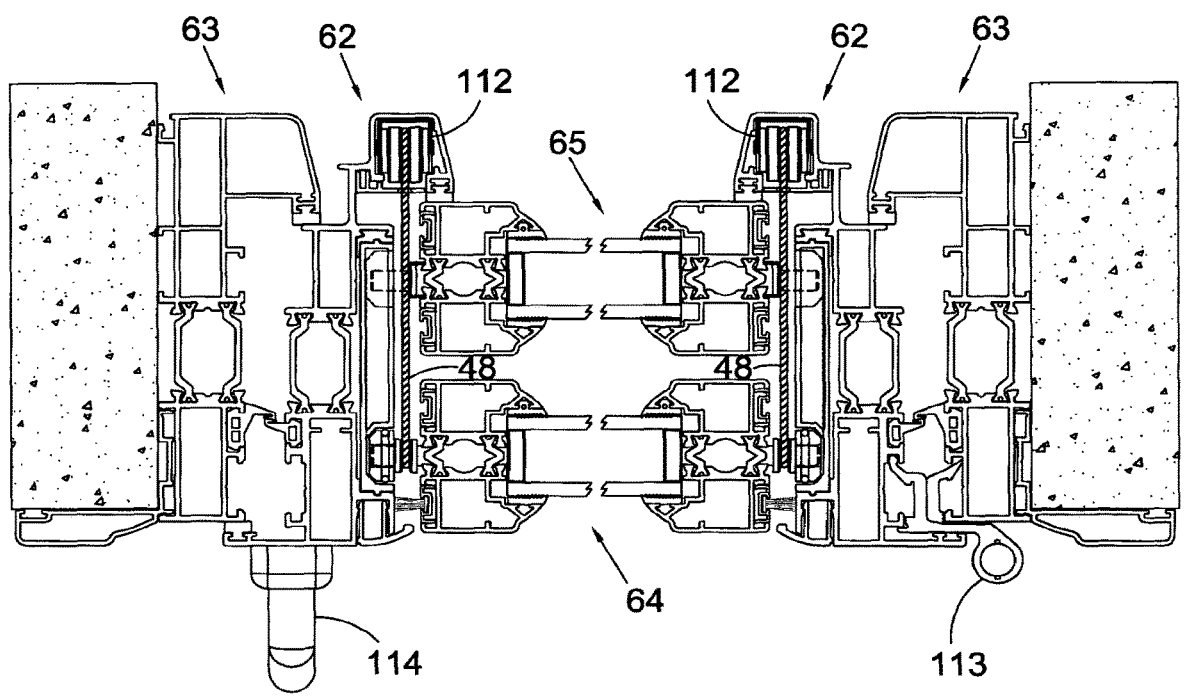
FIG. 9 shows a horizontal sectional view of the entire window with the movable sash of the small window being raised to an open position.
Figure 17:
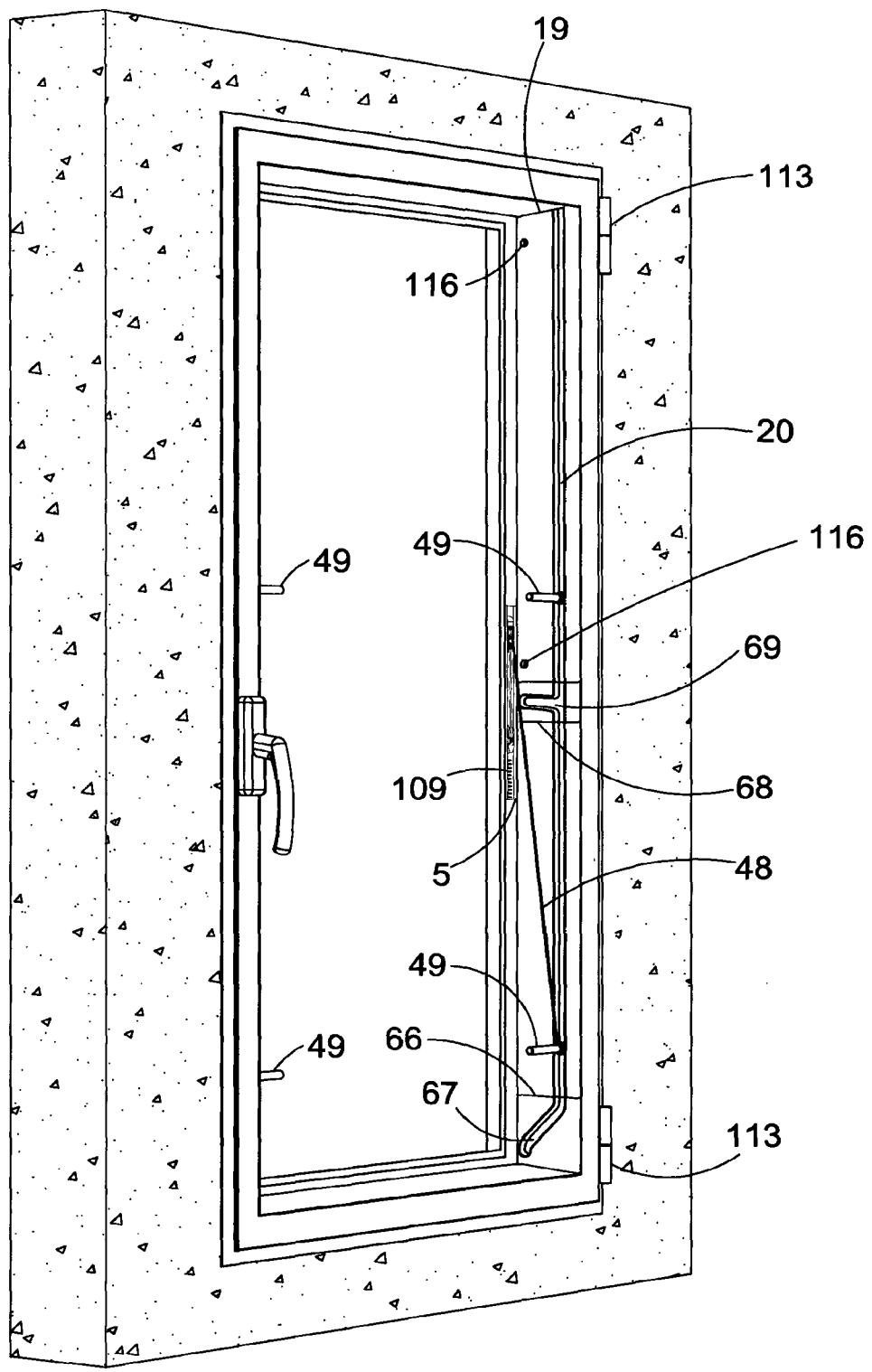
FIG. 17 is a view in perspective of the interior of the multifunctional window of the invention, without the small window sashes, illustrating the diverter insert guide members and longitudinal profile insert guide members that combine to create a predetermined channel within which move the roller wheels of the lower movable-divertible small window sash.

The main thermal break profile of the large opening-tilting sash 62 of the multifunctional window consists of profiles 1 and 12 which are connected to each other by means of plastic thermal break polyamides 11. The profile 1 has a groove 9 in which enters through sliding a plastic thermal break profile (polyamide) 10, such plastic profile 10 exposing a groove 25 that contributes to providing a thermally broken connection of an insert guide profile member 19 that is provided with protrusions in either of a pair of short sides thereof, one of these protrusions being adapted to slide within a groove 18 of profile member 12 and the other protrusion being adapted to slide within the groove 25 of the plastic profile 10 as shown in FIGS. 1B, 4 and 5. FIG. 6 shows the insert guide profile member 19 mounted at the top and bottom in the interior of the large sash 62, the profile member 19 being fitted therein with an exteriorly exposed planar surface thereof. However the vertically extending lengths of the insert guide profile member 19 are being fitted at the vertically extending sides in the interior of the large sash 62 with the reverse exteriorly exposed surface thereof, so as to provide the functionally required groove 20 adapted to receive the roller wheels 50, as shown in FIGS. 8 and 17. The profile members 1 and 12 are provided with grooves 3, 13 and 90 adapted to receive sealing gaskets 4, 14 and 16 respectively. The profile member 12 has an appropriately dimensioned groove 15 wherein are being fitted commercial hinges 113, tilting mechanisms and other accessories. The profile member 1 is provided with a flattened hole 6 for water drainage as well as with a cavity 2 within which fits the lifting mechanism 46 that comprises a H-sectioned housing 112 wherein fits a hoist with rollers 47 and a spring 109 which acts so as to provide reduction of the effort required for raising the movable-divertible small sash 64. The lifting mechanism 46, as shown in FIGS. 22 and 23, is provided with a specially configured nut 82 at the bottom thereof, this nut being provided with a cylindrical protrusion 83 at two sides thereof, these protrusions adapted to enter into respective holes of the .PI.-sectioned housing 112. A regulatory screw 84 with an interiorly threaded hole 85 adapted to receive a screw 86 that is fixedly mounted onto the specially configured nut 82. The screw 86 with a plastic washer 87 passes through a hole 123 of a retaining member 107 and screws into the interiorly threaded hole 85 of the regulatory screw 84. The retaining member 107 is provided with a pair of holes 124 and a shaft 108 is arranged to pass through these holes and a hooked lower end 99 of the spring 109 is adapted to be connected to such shaft 108. A plastic washer 87 is provided in between the screw 86 and the retaining member 107, such washer 87 providing reduction of friction so that when the regulatory screw 84 is rotated, the retaining member 107 remains stationary without spring 109 being forced to rotate. A plastic cap 110 with a hole 111 is provided at the bottom of the .PI.-sectioned housing 112, such plastic cap 110 being adapted to prevent electrolysis that might occur as a result of the abutment of the .PI.-sectioned housing 112 (if it is made from iron) with the aluminum profile as shown in FIGS. 22 and 23. This mechanism provides the ability to adjust the force required for raising and lowering the movable-divertible small sash 64 so as to obtain the best possible balance even after the window is installed. The user has to open the large window sash 62 and pass a hexagonal key through the hole 111 of the plastic cap 110. The key therefore reaches the hexagonal socket 100 provided at the head of the regulatory screw 84, thereby adjusting the regulatory screw 84 by rotating the key clockwise or counterclockwise, to respectively reduce or increase the pretension of spring 109 and accordingly reduce or increase the force required for raising the movable-divertible small window sash 64. The mechanism 46 is equipped with a cord 48 with a hook member 54 at the free end thereof that extends into an aperture 56 wherein the cord 48 is being connected. The cord 48 in the position of mounting by means of the hook member 54 onto the laterally extending shaft 49 is adapted to move freely and follow the variable positioning of the movable small window sash as shown in FIGS. 8, 9, 17 and 19. In place of the mechanism 46, a commercial mechanism with a hoist provided with a cord and a spring may be used, however without the advantageous regulatory screw 84 of mechanism 46 as described hereinabove.

In accordance with a preferred embodiment of the invention, a covering profile member 5 is adapted to snap and cover the opening of profile member 1 wherein the lifting mechanism is being fitted, such covering profile member extending downwardly from the middle of the large window sash and hiding the mechanism 46 so as to allow the cord 48 of the mechanism to move freely and in a direction parallel to the insert guide member 19. The installation of the mechanism 46 into the cavity 2 of the profile member 1 is pre-selected and designed to perform this function. Appropriate lengths of the profiles 1, 12 and 21 are being cut with their ends angularly configured at an angle of 45 degrees so as to generate frames of desired analogous sizes and following opening of the corresponding holes in a small punching machine, these profile lengths are joined with appropriately configured angular joints 17 and 8, which are introduced into the cavity 101 of profile 12 and into the cavity 7 of profile 1 respectively.

Figure 14:
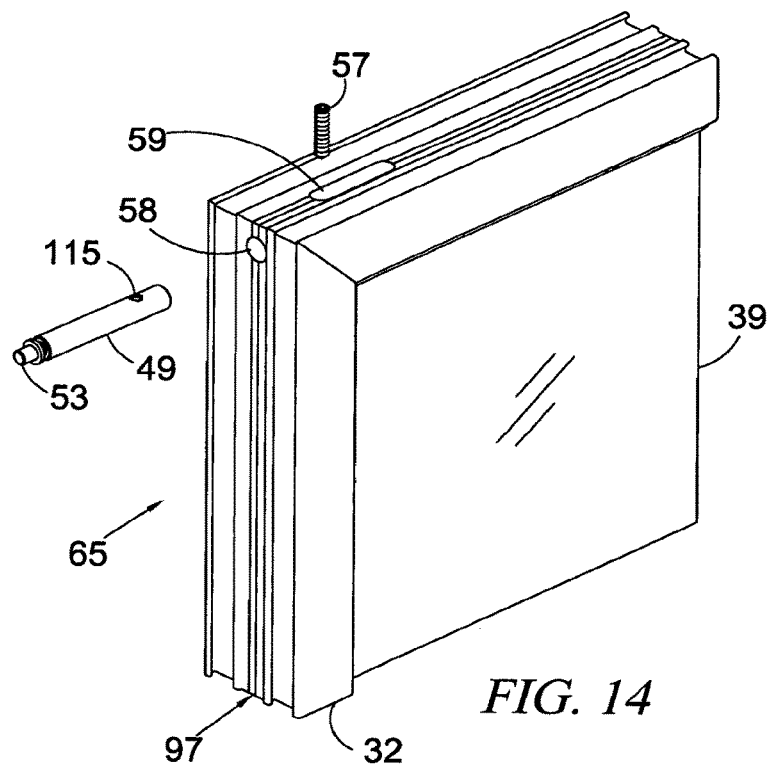
FIG. 14 shows a perspective view of an upper part of the stationary upper sash of the small window and the special shaft used to firmly support this upper sash of the small window onto the large opening-tilting window sash.
Figure 15:
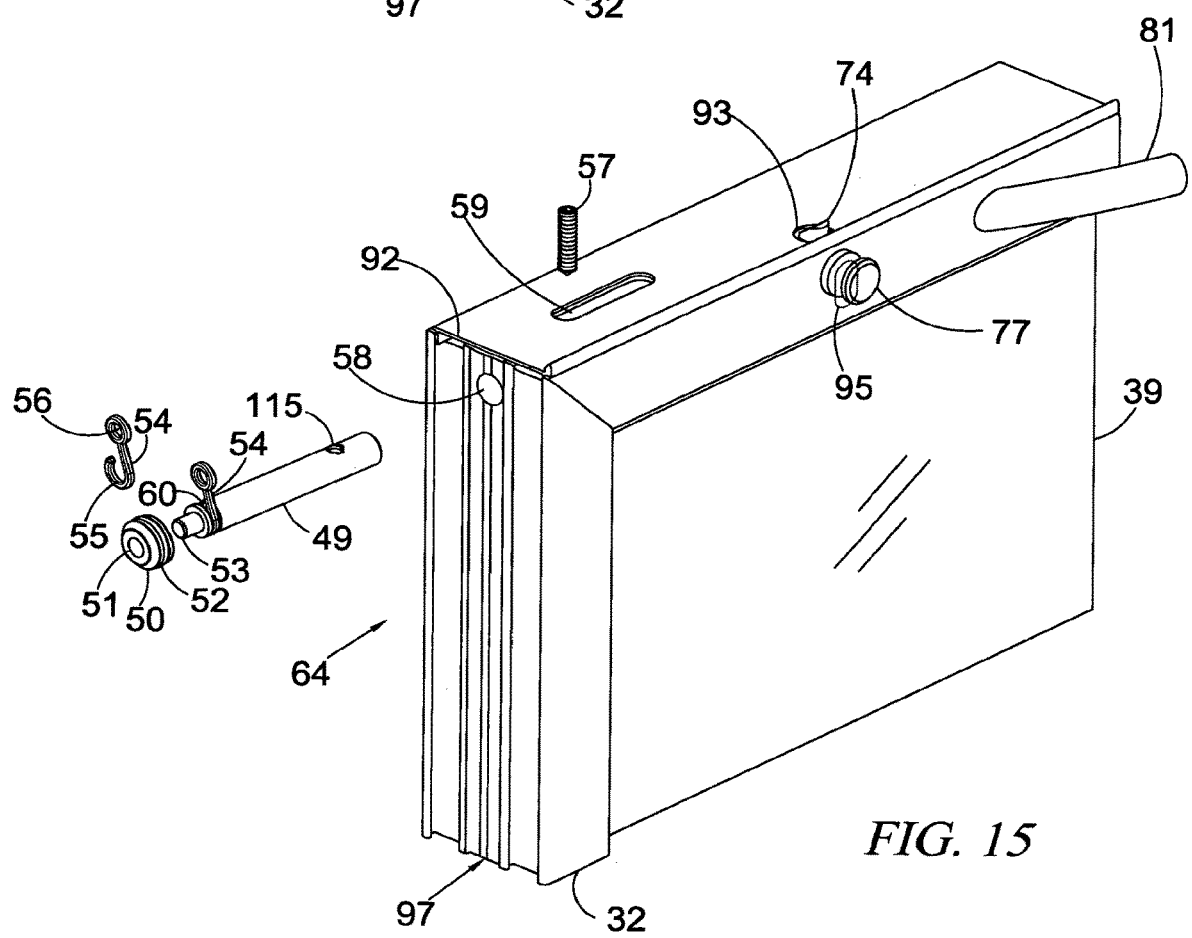
FIG. 15 shows a perspective view of an upper part of the movable-divertible sash of the small window and of the special shaft provided with a roller wheel and hook member whereupon is attached the cord that is connected to the lifting mechanism of this movable sash.
Figure 19:
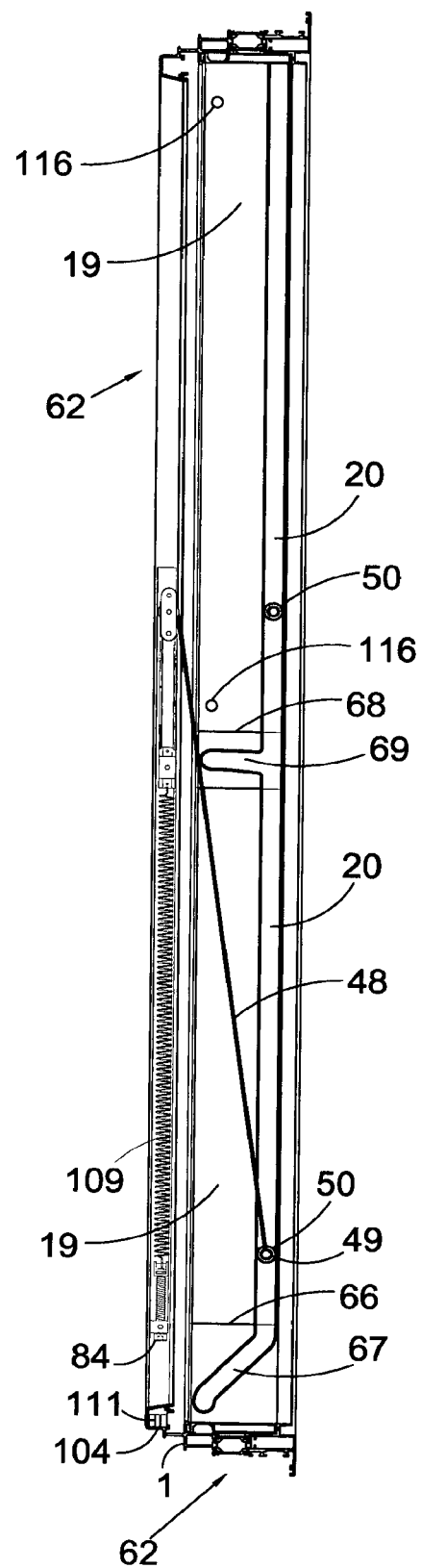
FIG. 19 shows a sectional view of a vertically extending profile member of the large opening-tilting sash of the multifunctional window with the predetermined channel within which move the roller wheels of the lower movable-divertible small window sash, the shafts with the roller wheels being adapted to roll within the abovementioned channel and the layout of the cord being provided to exert an upwardly directed pulling action on the lower small window sash to effect movement of the roller wheels thereof within the abovementioned channel.
Figure 20D:
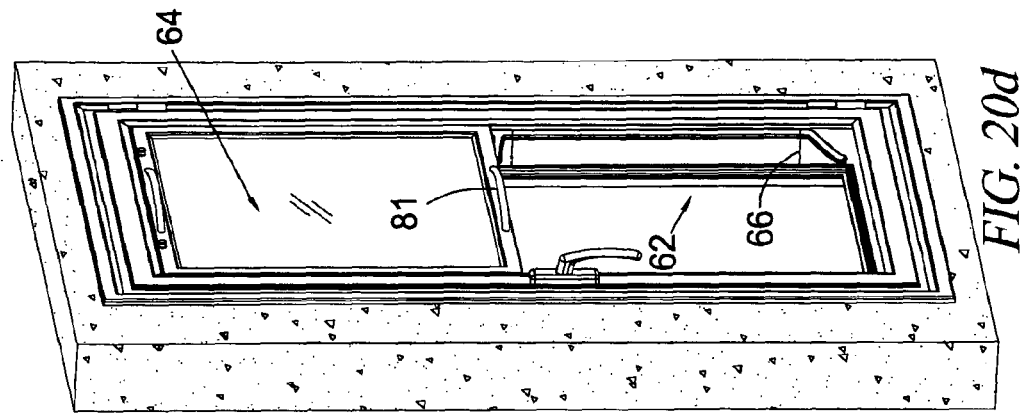
FIG. 20D is a perspective view of the multifunctional window with the lower movable-divertible small window sash fully raised superimposing and hiding the stationary small window sash.
Figure 20C:
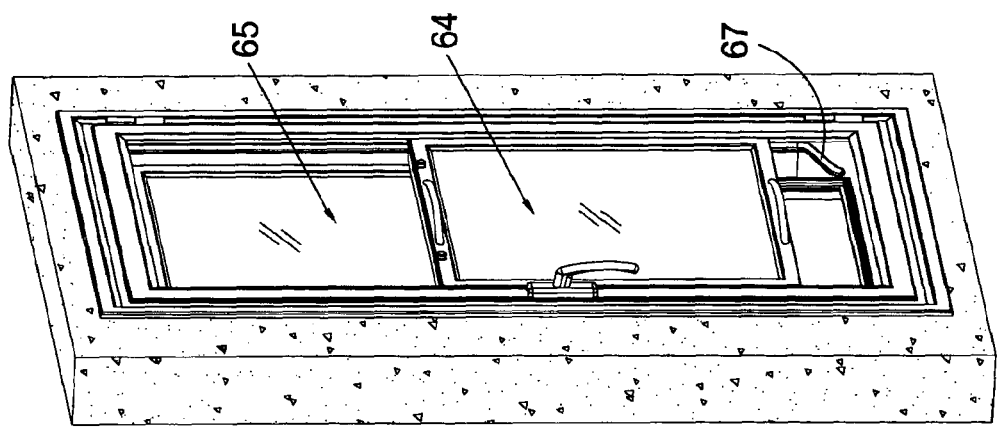
FIG. 20C shows a perspective view of the multifunctional window, wherein the diversion of the lower movable-divertible small window sash has been completed and the latter is shown lying on the aforementioned second plane partially superimposing the upper stationary small window sash.
Figure 20B:
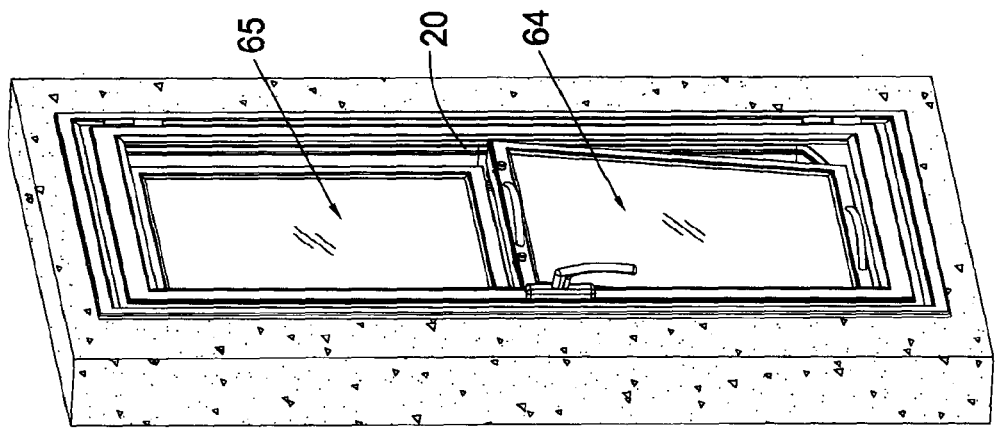
FIG. 20B shows a perspective view of the multifunctional window with the lower movable-divertible small window sash being tilted and brought in a diverted position whereby it may be lifted and move upwardly departing from a first plane of alignment with the upper small window sash and being brought at a second plane, parallel to the first plane, wherein it is superimposed onto the stationary upper small window sash.
Figure 20A:
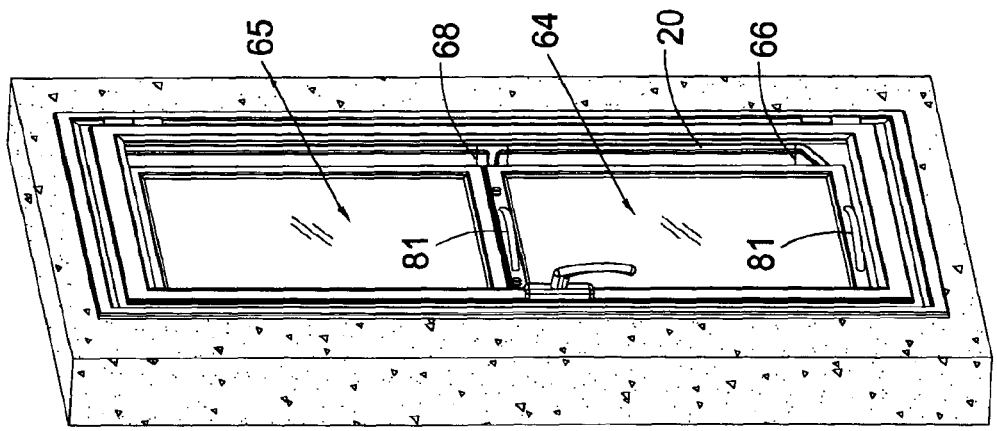
FIG. 20A is a perspective view of the multifunctional window with the lower movable-divertible small window sash in a closed position, in alignment with the upper stationary small window sash of the multifunctional window.
Figure 24:
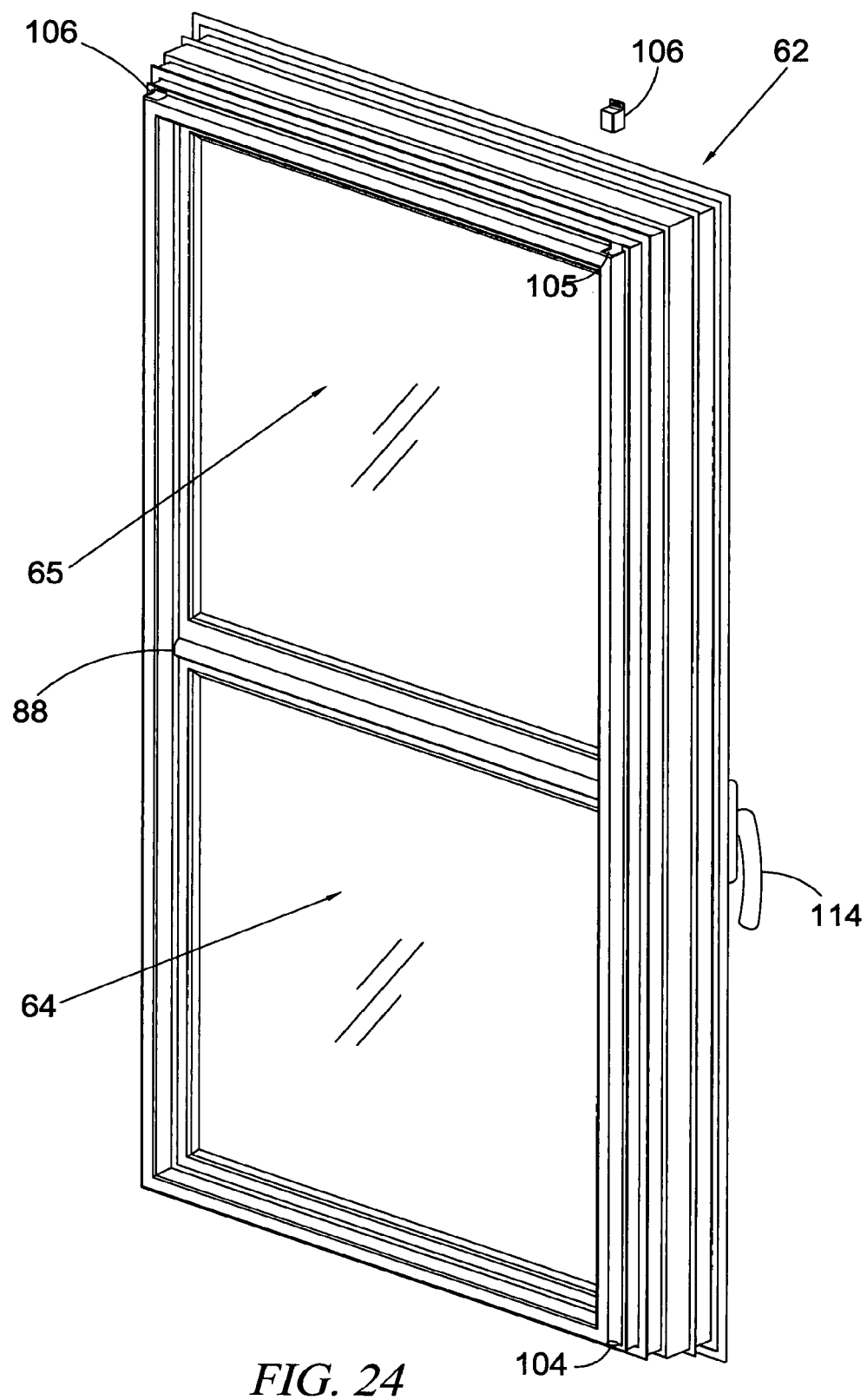
FIG. 24 shows in perspective the large sash of the multifunctional window with cap means adapted to cover the opening through which the lifting mechanisms are being inserted or removed along the vertically extending sides of the large sash, the right cap being shown removed and the left cap being shown plugged into an appropriately configured hole proximally to the left corner of the large sash.

The special large window sash 62 houses in the interior thereof a stationary sash 65 at an upper section thereof, wherein sash 65 is supported by four shafts 49 which enter through a side hole 58 thereof and thereafter into the aperture 42 as shown in FIGS. 14, 3A and 3B. The free ends 53 of shafts 49 enter into four holes 116 provided onto the insert guide profile member 19 as shown in FIGS. 17 and 19. An interiorly threaded hole 115 is provided at the circumference of shaft 49 and a fixing screw 57 passing through a longitudinally extending slot 59 along the horizontally extending sides proximally to the top and to the bottom corners of sashes 64 and 65 is screwed within this threaded hole 115 for immobilizing the shaft 49 at a desired position. It is herein noted that the fixing screw 57 moves within the slots 59 appropriately positioned at the small sashes 64 and 65 that predetermine the path of shafts 49 as shown in FIGS. 14 and 15. This mode of mounting ensures a prescribed support for the stationary small window sash 65 so that the sides thereof may correctly abut onto the rubber sealant 4. Furthermore, the movable/divertible small window sash 64 is accordingly securely supported by the shaft members 49 which are fitted within the aforementioned apertures 42 being centrally located at the thermal break profiles 97 and 98 from which the frames of the small window sashes 64 and 65 are being formed.

Figure 16:
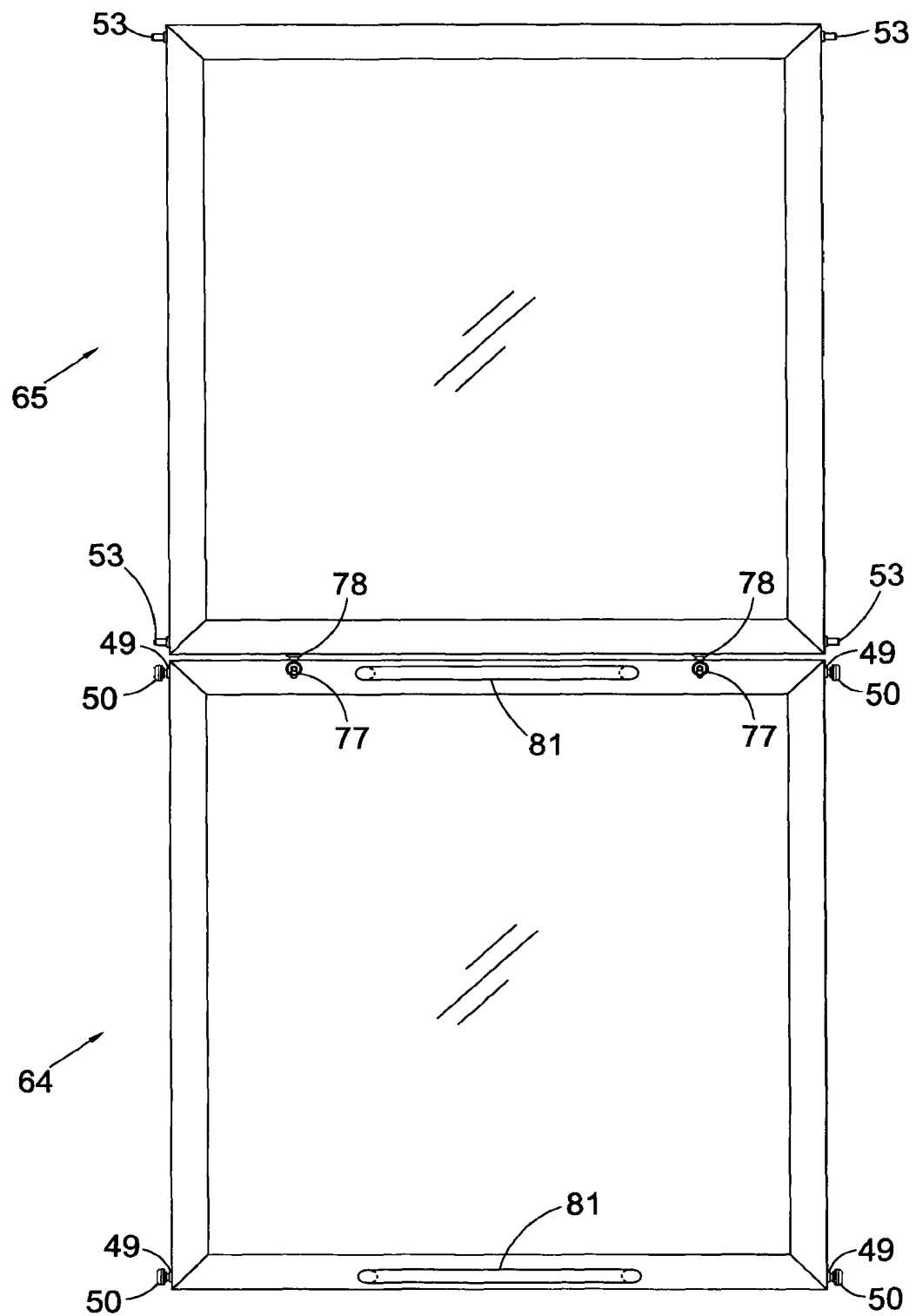
FIG. 16 shows a perspective view of the lower movable-divertible small window sash being provided with four shafts equipped with roller wheels at the four edges thereof, and of the upper stationary small window sash being accordingly provided with four supporting shafts at the four edges thereof.
Figure 18:
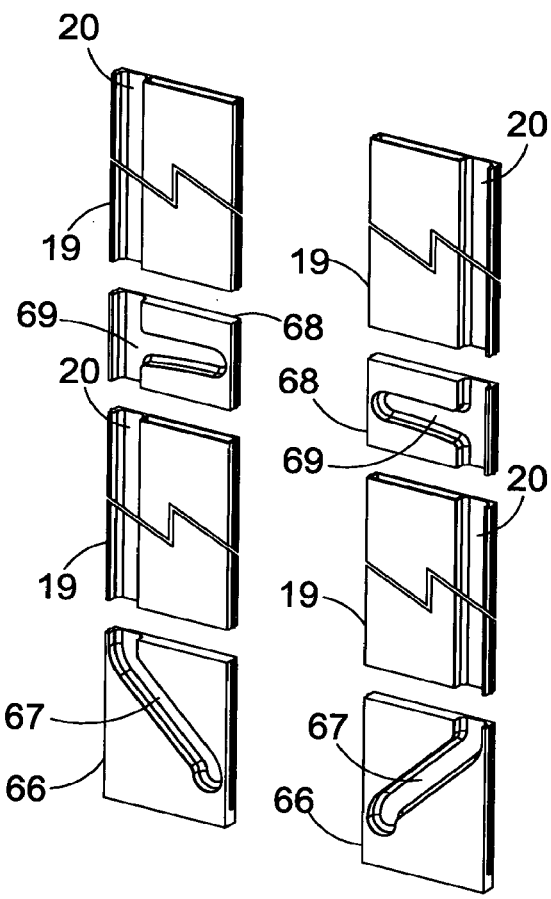
FIG. 18 shows a perspective view of the pairs of insert guide members and diverter insert guide members that create the above mentioned predetermined channel within which move the roller wheels of the lower movable-divertible small window sash.

The large openable/tiltable sash 62 is also provided in the interior thereof with a small movable-divertible sash 64 that comprises shafts 49 at the four ends thereof, wherein these shafts 49 are provided with roller wheels 50 with an exterior annular rubber member 52 that ensures a noiseless rolling thereof as shown in FIGS. 15, 16 and 19. The roller wheels are driven within a prescribed channel, on both vertically extending sides of the large sash 62, the hereinabove prescribed channel comprising an inclined groove 67 of a bottom diverter insert guide member 66, the vertically extending groove 20 of a first portion of the insert guide profile member 19, a horizontally extending groove 69 of a diverter insert guide member 68 located medially of the sash 62, and the vertically extending groove 20 of a second portion of the insert guide profile member 19 as shown in FIGS. 17, 18 and 19. By analogically cutting the above-mentioned first and second portion of the insert guide profile member 19, all requirements of different window heights can be satisfied. The insert guide profile member automatically determines the position of the medially located diverter insert guide member 68. The diversion of the small window sash 64, as well as its predetermined path is achieved by means of the two pairs of diverter insert guide members 66 and 68, which are adapted to be inserted through sliding in place of and in between the portions of the insert guide profile members 19 along the vertically extending sides in the interior of the large sash 62.

Figure 10:
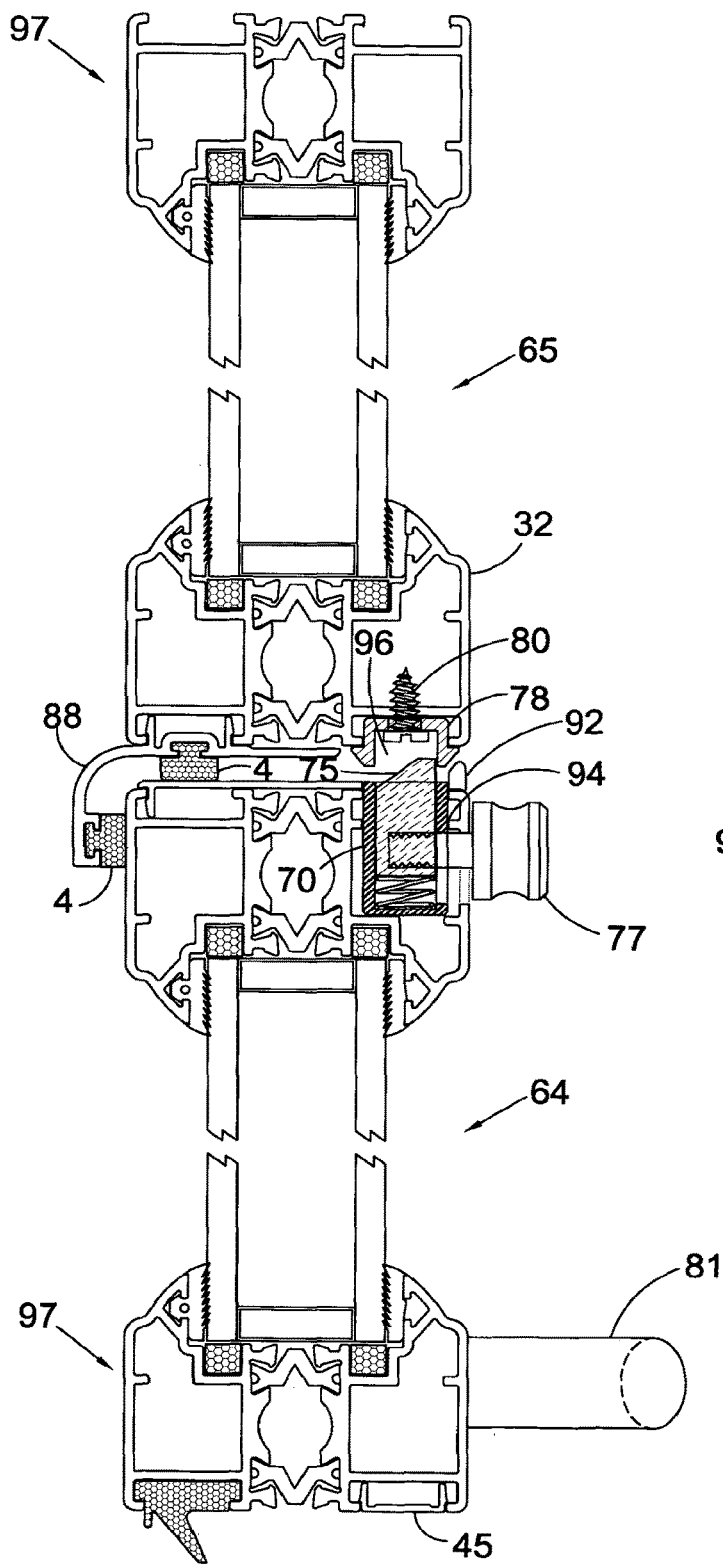
FIG. 10 shows a sectional view of the two sashes of the small window in a closed and locked position with the lock provided for securely locking the same.
Figure 11:
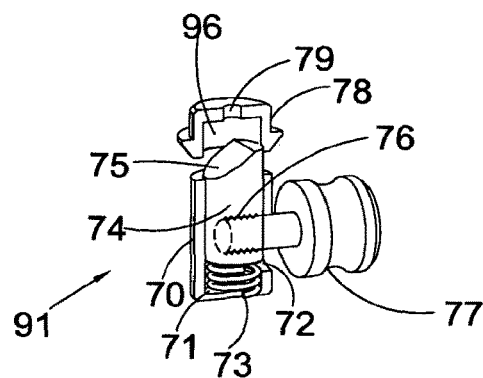
FIG. 11 shows in a perspective half-sectional view the lock of the sashes of the small window.

The insert guide profile members 19 are provided with a groove 20 with a section substantially similar to the groove 67 of the lower diverter guide member 66 and to the groove 69 of the median diverter guide member 68. When the movable small sash 64 is lowered, the bottom two roller wheels 50 supported at the ends of shafts 49 force the bottom part of the sash 64 to divert, so that its bottom reaches the end of the groove 67 of the diverter guide member 66. In this phase, the cord 48 of the mechanism 46 freely follows the direction of the shaft 49. Thereafter the upper handle 81 is used to push the movable small window sash inwardly, thereby automatically locking it onto the stationary small sash 65. A median diverter guide member 68 is located at the center of the two upper shafts of the small window sash 64, intermediately between the first and the second portions of the insert guide profile member 19 so that the upper roller wheels 50 of the movable sash 64 may be oriented in a direction parallel to that of the lower roller wheels. The opening of the sash is simply as follows: we pull the upper handle 81 and then lift the movable small window sash upwardly as shown in FIGS. 20A, 20B, 20C, 20D. The window is easily lifted by means of lifting mechanisms 46 located within the cavity 2 of profile member 1 on either interior vertically extending side of the large sash, each lifting mechanism 46 being provided with a cord 48 having its free end connected to the hook member 54 that is connected to the lower shaft 49 of the small movable-divertible sash 64 as shown in FIGS. 17 and 19. The locking of the movable-divertible sash 64 is effected by means of the locking device 91 shown in FIGS. 6 and 10. The locking device 91 consists of a main body 70 having a hole 71 and an oval slot 72. A latch 74 with an inclined plane 75 is adapted to be introduced into the hole 71. The latch 74 is provided with a threaded hole 76 adapted to receive a specially configured screw 77 that is screwed therein after passing through the oval slot 72 of the main body 70. The length of the oval slot 72 determines the path of the specially configured screw 77. At the bottom of the hole 71 of the main body 70 there is provided a small opened spring 73 that is adapted to push the latch upwardly as shown in FIG. 11. The main body 70 of the locking device 91 is adapted to fit into a hole 93 of the profile 92 and into the hole 94 of the profile 32 or 33, whilst the specially configured screw 77 passes through the oval slot 95 of the profile 32 or 33 which is similar to the oval slot 72 of the main body 70. The screw 77 is thereafter screwed into the threaded bore 76 of the latch 74 being glued therein with a commercially available semi-permanent metallic glue so that it does not easily loosen. The latch receptacle 78 is adapted to fit in the groove 41 of the profile 32 or 33 and is supported by a screw 80 as shown in FIG. 10. When the user pushes the divertible sash 64 inwardly, the inclined plane 75 of the latch 74 encounters the receptacle 78 and, due to the inclined plane, the latch recedes. In this phase, the spring 73 is being compressed and, when the latch 74 encounters the central hole 96, the spring pushes the latch upwardly and locking of the divertible sash 64 onto the stationary sash 65 is achieved. One or two locking devices 91 might be placed on the sash. In order to open the divertible sash 64 of the window, the user pushes the head of the specially configured screw 77 downwardly, and the screw 77 moves within the predetermined oval slot 72 simultaneously with the latch 74 and then pulls the window towards its side. The window is thereafter being raised upwardly by means of the handle 81.

The components of the locking device are made of stainless steel so that they do not wear out and are easily manufactured in an automatic lathe at a low cost.

A fully proof water and air tightening fitting of the lower and upper sashes 64 and 65 is achieved when they are brought in alignment and abut the rubber sealant 4 provided within the cavity 3 of the large sash 62 and further through abutment onto the rubber sealants 4 provided onto a profile member 88 that is snapped onto a bottom side of the sash 65 along a plane of abutment of sash 64 when aligned with sash 65.

Figure 12:
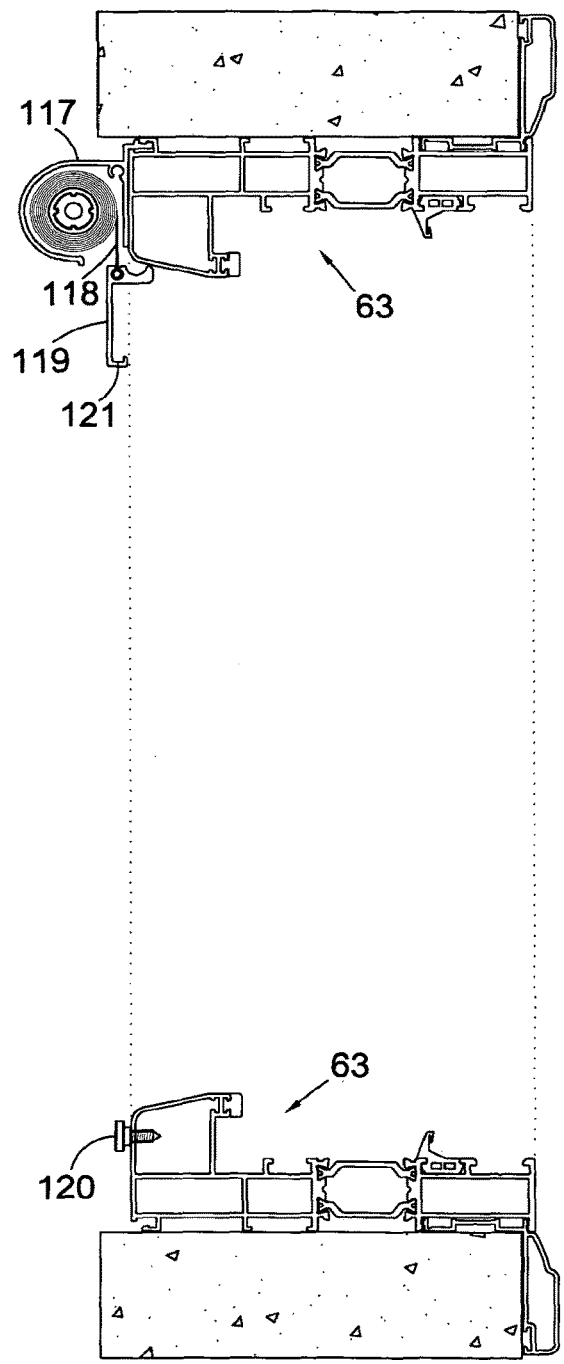
FIG. 12 shows a side view of the top and bottom of the frame member of the large window with the anti-insect sheet roll fixture incorporated therein and the anti-insect sheet shown at an elevated position wound around this roll fixture.
Figure 13:
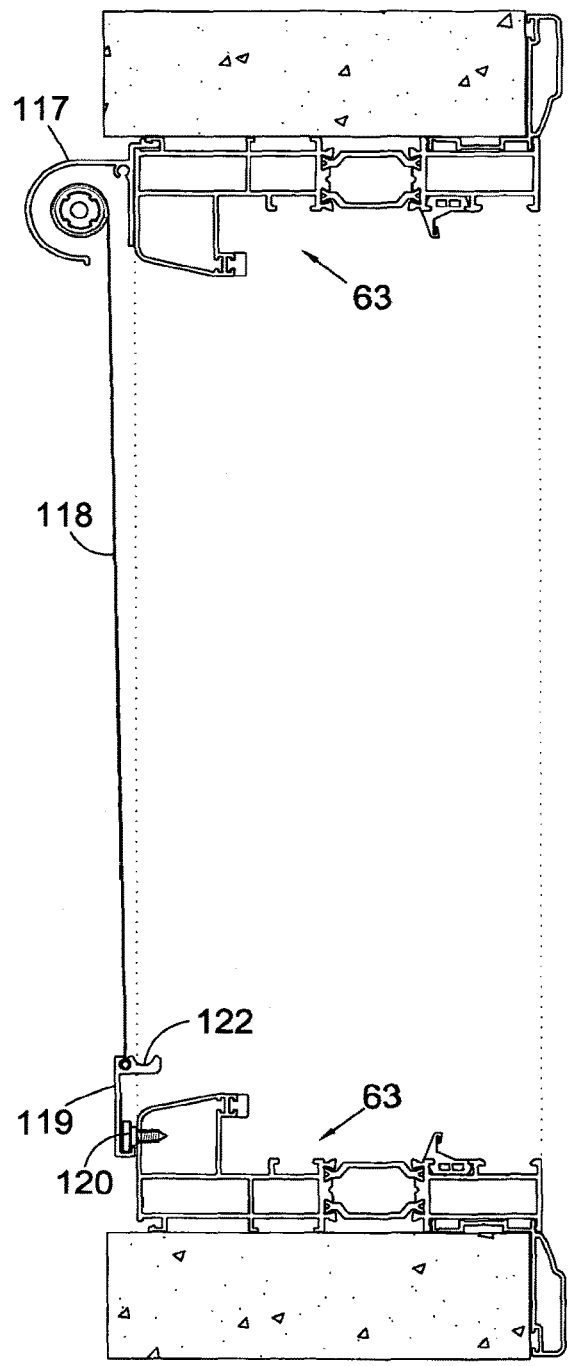
FIG. 13 shows a side view of the top and bottom of the frame member of the large window with the anti-insect sheet roll fixture incorporated therein and the anti-insect sheet shown at a fully deployed position from the top to the bottom of the window.

At the top of the fixedly mounted frame member 63, as shown in FIGS. 12 and 13, a profile 117 is provided wherein an automatically operated mechanism of a rolling anti-insect sheet 118 is being wound, a profile member 119 being provided at the bottom thereof to provide support of the anti-insect sheet 118. The user opens the entire window and lowers the profile 119 downwardly, the sheet being grasped from the handle 122 so that the cavity 121 of the profile member 119 enters the head of the special screw 120. The screw 120 is being screwed at two points, at the left and the right of the frame profile member 63.

The above basic components are assembled as shown in the attached drawings in one basic constructional and operational embodiment thereof and can be manufactured in any desired shape, size or configuration and type of material. For each specific construction required, it is possible to modify either profile shapes and components and/or the operating mechanisms thereof, without departing from the basic principles of the invention that provides the aforementioned advantages. It is noted that in an alternative embodiment, the profile of the large sash described hereinabove may be used as a frame fixedly mounted at the surrounding wall opening to receive the small window sashes as described hereinabove.

NOMENCLATURE OF PROFILES AND ACCESSORIES

1. Outer profile for the creation of the main thermal break profile of the large openable-tiltable sash 62.
2. Cavity for insertion of the lifting mechanism of the movable-divertible small sash 64.
3. Insertion groove for rubber sealing gasket 4 in sash 62.
4. Rubber sealing gasket.
5. Covering profile of the lifting mechanism.
6. Water drainage aperture of profile 1.
7. Cavity for the insertion of mechanical corner joint of profile 1.
8. Mechanical corner joint of profile 1.
9. Groove of profile 1 for supporting the plastic thermal break profile 10.
10. Plastic thermal break profile.
11. Plastic thermal break profile used to connect profiles 1, 12 and profiles 22 and 26.
12. Interior profile for the creation of the main thermal break profile of the large openable-tiltable sash 62.
13. Groove of profile 12 for the insertion of rubber sealing gasket 14.
14. Rubber sealing gasket.
15. Groove of profile 12 for the mounting of opening system's hardware, e.g. hinges, tilt and turn mechanism accessories, etc.
16. Central rubber sealing gasket in sash 62.
17. Mechanical corner joint.
18. Groove of the interior profile 12 for the insertion of the insert guide member 19.
19. Insert guide member.
20. Groove for roller wheels 50.
21. Profile snapping at an exterior of profile 12.

22. Outer profile for the creation of the window's frame thermal break profile.
23. Groove in profile 22 for supporting rubber sealing gasket 4.
24. Water drainage apertures.
25. Groove of the plastic thermal break profile 10 for the insertion of the insert guide member 19.
26. Interior profile for the creation of the window's frame thermal break profile.
27. Groove in profile 26 for the mounting of opening system's hardware e.g. hinges, tilt and turn mechanism accessories, etc.
28. Groove in profile 26 for supporting the central rubber sealing gasket 29.
29. Central rubber sealing gasket in the frame thermal break profile.
30. Snapping or screwable wall covering profile in the interior of interior profile 26.
31. Mounting screw of profile 30.
32. Profile for the creation of the thermal break profile 97 of the movable-divertible or fixed small sash for use without a glazing supporting metallic strip 34.
33. Profile for the creation of the thermal break profile 98 of the movable-divertible or fixed small sash for use with a glazing supporting metallic strip 34.
34. Metallic strip that supports glazing 39 that clips at an angle of 45°.
35. Plastic thermal break profile of profiles 32 and 33.
36. Mechanical corner joint of profiles 32 and 33.
37. Rubber sealing gasket that clips at one side of glazing 39.
38. Rubber sealing gasket that fits at the other side of glazing 39.
39. Double pane glazing of movable-divertible sash 64 and of stationary sash 65.
40. Perimetric rubber sealing gasket of glazing 39.
41. Groove profiles 32 and 33.
42. Aperture formed at the middle of thermal break profiles 97 and 98 intermediately between profiles 32 or 33 of the small sashes for the insertion and support of shaft 49.
43. Rubber sealing gasket of profile 32.
44. Clipping profile with groove for weather strip 125 of profile 32 or 33.
45. Cover profile of groove 41 of profiles 32 or 33.
46. Lifting mechanism of the movable-divertible small sash 64.
47. Rollers for the hoist of lifting mechanism 46.
48. Cord of the lifting mechanism 46.
49. Specially configured shaft.
50. Roller Wheel.
51. Central bore of roller wheel 50.
52. Annular rubber member of roller wheel 50 for noise reduction.
53. Free end of shaft 49.
54. Hook member at the end of cord 48.
55. Grapnel of hook member 54.
56. Eyelet of hook member 54 for the entry and attachment of cord 48.
57. Fixing screw for immobilizing shaft 49 at a desired position.
58. Hole at the vertically oriented thermal break profile 97 or 98 which meets with the central aperture 42 of horizontally oriented profile 97 or 98 for the insertion of shaft 49.
59. Longitudinally extending slot at the top of the sash 64 and 65 for the insertion of the fixing screw 57.
60. A circular recess of the shaft 49 for supporting of hook member 54.
61. Interior tooth of profile 33 for mounting the metallic strip 34.
62. Large openable-tiltable sash.
63. Fixed frame profile member.
64. Movable-divertible small sash.
65. Stationary small sash.
66. Bottom diverter.
67. Groove of diverter 66.
68. Medially located diverter.
69. Groove of diverter 68.
70. Main body of lock device.
71. Hole of the main body 70.
72. Oval slot of the main body 70.
73. Spring of the locking device.
74. Latch.
75. Inclined plane of latch 74.
76. Threaded bore of latch 74.
77. Threaded specially configured screw.
78. Receptacle of latch 74.
79. Hole of receptacle 78.
80. Screw for mounting receptacle 78.
81. Handle.
82. Special nut for the regulatory screw 84.
83. Circular protrusion of the special nut 82 for supporting it onto the base 112.
84. Regulatory screw.
85. Threaded hole at the top end of the regulatory screw 84.
86. Screw.
87. Plastic washer.
88. Profile member that snaps at the bottom of the fixed small sash.
89. Commercial cap with valve.
90. Groove of profile 12.
91. Locking device.
92. Snapping profile at the top of the movable-divertible small sash 64.
93. Hole of profile 92.
94. Hole of profile 32 for insertion of the main body 70 of locking device 91.
95. Oval slot of the profile 32 similar to the oval slot 72 of the main body 70.
96. Central hole of the latch receptacle 78.
97. Thermal break profile of small sash without glazing supporting metallic strip.
98. Thermal break profile of small sash with glazing supporting metallic strip. [
99. Hooked lower end of spring 109.
100. Hexagonal recess at the head of the regulatory screw 84.
101. Cavity of profile 12 adapted to receive mechanical corner joints for the connection of appropriate lengths of profile 12 to form the large window frame.
102. Cavity for the insertion of a mechanical corner joint in profile 32.
103. Cavity for the insertion of a mechanical corner joint in profile 22.
104. Hole of profile 1 for the insertion of the key for the rotation of the regulatory screw 84.
105. Square opening of profile 1 for removing the lifting mechanism of the small divertible sash.
106. Cap of the square opening 105.
107. Retaining member of the regulatory screw.
108. Shaft for support spring 109.
109. Support spring.
110. Base cap.
111. Hole of the base cap.
112. H-sectioned housing of the lifting mechanism 46.

113. Hinge.
114. Cremone for the large sash 62.
115. Threaded hole of shaft 49.
116. Holes within which are inserted the shafts 49 of the stationary small sash 65.
117. Profile for the winding of the anti-insect sheet 118.
118. Anti-insect sheet.
119. Profile for supporting the bottom part of the anti-insect sheet 118.
120. Special screw for supporting the anti-insect sheet 118.
121. Cavity at the bottom of profile 119 supported by the special screw 120.
122. Handle of 119.
123. Hole of 107.
124. Hole of 107 for the insertion of shaft 108.
125. Brush weatherstrip.

The invention claimed is:

1. A multifunctional window comprising:
a frame profile member adapted for mounting in a wall opening;
an opening sash arrangement connected to the frame profile member with hinges in order to allow relative rotation about a vertical axis;
said sash arrangement including a sash frame, an insert guide profile arrangement located along each of two opposing vertical sides of the sash frame, and a window comprising a pair of superimposing lower and upper window sashes located within the sash frame and between the insert guide profile arrangements;
each vertically extending side of said lower and upper sashes including a pair of laterally extending shafts, said shafts of said upper window sash being introduced within holes of the insert guide profile arrangements on each of the two opposing vertical sides for stationary mounting of said upper window sash, said shafts of said lower window sash each having a roller wheel that is adapted to move within a predetermined channel provided by each of the insert guide profile arrangements;
the insert guide profile arrangements each including a diverter insert guide member with an inclined groove, a first portion of an insert guide profile member with a vertically extending groove, a diverter insert guide member with a horizontally extending groove located medially of the sash arrangement, and a second portion of the insert guide profile member with a vertically extending groove, said predetermined channel adapted to provide a rolling path of said roller wheels of said lower window sash comprises the grooves of the diverter insert guide member, the first portion of the insert guide profile member, the diverter insert guide member, and the second portion of the insert guide profile member;
wherein said lower window sash is configured to be diverted and lifted upwardly with the roller wheels thereof moving within said predetermined channel so as to alternately raise said lower window sash to an opened position superimposing said stationary upper sash and a closure position of alignment with said stationary upper sash;
wherein the same said diverter insert guide members are employed irrespectively of different heights of said multifunctional window, accommodation of such different heights being achieved through cutting appropriate lengths of said first and said second portions of said insert guide profile member; and
a lifting mechanism including cords attached to at least two of the laterally extending shafts on opposite sides of the lower sash, rollers connected to the sash frame above a medial position of the diverter insert guide member, with the cords extending over the rollers, and springs located within a housing profile of the sash frame that are connected to the cords to reduce a force required for raising the lower sash.

2. The multifunctional window of claim 1, wherein the shafts of the upper sash are laterally displaceable to allow removal of said upper sash.

3. The multifunctional window of claim 1, further comprising a seal provided on a profile member that is connected with a snap fit onto a bottom side of the upper sash along a plane of abutment with the lower sash when aligned with the upper sash to seal the upper sash to the lower sash in the closure position.

4. The multifunctional window of claim 1, further comprising a nut provided proximally to a bottom of said housing profile of the sash frame, a regulatory screw with a threaded hole that is adapted to receive a screw, said screw passing through a hole of a retaining member and into the threaded hole of the regulatory screw, a plastic washer between the screw and the retaining member providing for a reduction of friction so as to maintain the retaining member stationary without the spring being forced to rotate during rotation of said regulatory screw, wherein rotation of said regulatory screw results in adjustment of a pretension of said spring to adjust a force required for lifting and lowering said lower sash.

5. The multifunctional window of claim 1, further comprising an anti-insect sheet frame profile connected at a top of the frame profile member, a rolling anti-insect sheet located in the anti-insect sheet frame profile, a connection profile member located at a bottom of the anti-insect sheet, and catch screws located at a bottom region on both sides of the frame profile member on which the connection profile member is engagable.

6. The multifunctional window of claim 1, wherein the upper window sash and the lower window sash comprise frames formed from two identical window sash profile members connected by plastic thermal break parts.

7. The multifunctional window of claim 6, wherein the window sash profile members include C-shaped channels, and ends of the plastic thermal break parts are engaged in opposing ones of the C-shaped channels on the two identical window sash profile members arranged facing one another.

8. The multifunctional window of claim 1, further comprising a locking device configured to automatically lock the lower sash with the upper sash in the closure position.

9. A multifunctional window comprising:
a frame profile member adapted for mounting in a wall opening;
an opening sash arrangement connected to the frame profile member with hinges in order to allow relative rotation about a vertical axis;
said sash arrangement including a sash frame, an insert guide profile arrangement located along each of two opposing vertical sides of the sash frame, and a window comprising a pair of superimposing lower and upper window sashes located within the sash frame and between the insert guide profile arrangements;
each vertically extending side of said lower and upper sashes including a pair of laterally extending shafts, said shafts of said upper window sash being introduced within holes of the insert guide profile arrangements on each of the two opposing vertical sides for stationary mounting of said upper window sash, said shafts of said lower window sash each having a roller wheel that is adapted to move within a predetermined channel provided by each of the insert guide profile arrangements;

the insert guide profile arrangements each including a diverter insert guide member with an inclined groove, a first portion of an insert guide profile member with a vertically extending groove, a diverter insert guide member with a horizontally extending groove located medially of the sash arrangement, and a second portion of the insert guide profile member with a vertically extending groove, said predetermined channel adapted to provide a rolling path of said roller wheels of said lower window sash comprises the grooves of the diverter insert guide member, the first portion of the insert guide profile member, the diverter insert guide member, and the second portion of the insert guide profile member;

wherein said lower window sash is configured to be diverted and lifted upwardly with the roller wheels thereof moving within said predetermined channel so as to alternately raise said lower window sash to an opened position superimposing said stationary upper sash and a closure position of alignment with said stationary upper sash;

wherein the same said diverter insert guide members are employed irrespectively of different heights of said multifunctional window, accommodation of such different heights being achieved through cutting appropriate lengths of said first and said second portions of said insert guide profile member;

a locking device configured to automatically lock the lower sash with the upper sash in the closure position; and the locking device comprises a main body connected to a top of the lower sash with a hole defined therein and an oval slot that intersects the hole; a latch with an inclined plane slidably received in the hole, a knob connected to the latch that extends out from the oval slot, a length of the oval slot defining a movement path of the knob; an engagement spring in the hole that biases the latch upwardly into a latched position; and a latch receptacle connected to bottom of the upper sash, the latch receptacle including a latch receiving opening, such that as the lower sash is pushed inwardly toward the closure position, the inclined plane of the latch contacts a side of the latch receptacle and is deflected downwardly against a force of the engagement spring until the latch is aligned with the latch receiving opening and the spring pushes the latch upwardly to lock the lower sash to the upper sash.

* * * * *